United States Patent
Sen

(10) Patent No.: US 11,395,032 B2
(45) Date of Patent: Jul. 19, 2022

(54) AUTOPLAY RECOMMENDATIONS AND SEQUENCING IN FULL SCREEN VIDEO MODE

(71) Applicant: Rovi Guides, Inc., San Jose, CA (US)

(72) Inventor: Susanto Sen, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/913,998

(22) Filed: Jun. 26, 2020

(65) Prior Publication Data
US 2021/0409812 A1  Dec. 30, 2021

(51) Int. Cl.
| | |
|---|---|
| *H04N 7/025* | (2006.01) |
| *H04N 21/431* | (2011.01) |
| *H04N 21/81* | (2011.01) |
| *H04N 21/845* | (2011.01) |
| *G06N 20/00* | (2019.01) |
| *H04N 21/45* | (2011.01) |
| *H04N 21/466* | (2011.01) |
| *H04N 21/442* | (2011.01) |

(52) U.S. Cl.
CPC ......... *H04N 21/4316* (2013.01); *G06N 20/00* (2019.01); *H04N 21/44204* (2013.01); *H04N 21/4532* (2013.01); *H04N 21/466* (2013.01); *H04N 21/8153* (2013.01); *H04N 21/8456* (2013.01)

(58) Field of Classification Search
CPC ........... H04N 21/4823; H04N 21/4622; H04N 21/44222; H04N 21/4722; H04N 21/4312; H04N 21/25891
USPC .................................. 725/32, 35, 14, 25, 34
See application file for complete search history.

(56) References Cited

U.S. PATENT DOCUMENTS

| | | | |
|---|---|---|---|
| 7,644,427 B1 | 1/2010 | Horvitz et al. | |
| 2003/0093790 A1 | 5/2003 | Logan et al. | |
| 2007/0186180 A1 | 8/2007 | Morgan | |
| 2008/0060001 A1 | 3/2008 | Logan et al. | |
| 2012/0042251 A1* | 2/2012 | Rodriguez | G11B 27/34 715/723 |
| 2014/0359656 A1 | 12/2014 | Banica et al. | |
| 2019/0149885 A1 | 5/2019 | Madison et al. | |
| 2019/0273972 A1* | 9/2019 | Soderbergh | H04N 21/8545 |

* cited by examiner

*Primary Examiner* — Jivka A Rabovianski
(74) *Attorney, Agent, or Firm* — Haley Guiliano LLP

(57) ABSTRACT

Systems and methods for automatic display of recommended media content items are disclosed. A current media content item is displayed on a display screen. Subsequent media content items are identified in a remaining runtime of the media content based on preferences of a consumer profile. When a threshold period of time remains for displaying the current media content item, a sequential order of identifiers that identify the subsequent media content items, respectively, are displayed simultaneously with the displaying of the current media content item on the display screen. The sequential order is rearrangeable. A request is received to rearrange the sequential order of the identifiers and in response, the identifiers are displayed in a rearranged sequential order. At the conclusion of the current media content item, the subsequent media content items are automatically displayed according to the rearranged sequential order.

20 Claims, 10 Drawing Sheets

AUTOPLAY RECOMMENDATIONS AND SEQUENCING IN FULL SCREEN VIDEO MODE

BACKGROUND

The present disclosure relates to media content display processing and, more particularly, to systems and methods related to automatic media content identification display techniques.

SUMMARY

Typical media players automatically play ("autoplay") recommended media content, sometimes referred to as "up next" or "upcoming," on corresponding media player display screens for media content consumers. Electronic consumer products with media players span across various technology platforms, such as smartphones and computers. In both platforms, the media player upcoming content feature is often limited to a partial display screen mode. A viewer watching a television series in full display screen mode, for example, typically lacks access to upcoming or related programs unless the viewer makes a conscious effort to switch from the current full display screen mode to a partial display screen mode, a matter of viewing disruption and consumer inconvenience.

A media content consumer is additionally inconvenienced by the limited "upcoming" content selection options offered by today's technology. Presented with a list of content provider pre-selected media content, as broadly as the choices may sound, the consumer is nevertheless presented with a rather narrow offering, a binary choice, to display the "up next" content, or not. For example, a consumer may be presented with episodes 2-6 of season 1 of the popular television series "Game of Thrones", yet the consumer-preferred order of interest may be episode 2 of season 1 of the series, followed by episode 1 of season 2 and episodes 3-6 of season 1. But in today's landscape of media content display features, the rearrangement of the order in which the consumer prefers to watch the episodes is not necessarily a matter of consumer choice. Indeed, the queue of upcoming media content is often a fixed and inflexible content list, preventing the consumer from optionally rearranging the media content order in the queue as may be desired.

Conventional media content display technology not only suffers from limited consumer media program selection features, such as those discussed above; it is typically additionally prohibitive of consumer media content segment selection. For example, when watching a current scene of episode 1, season 1 of Game of Thrones, a consumer cannot readily select a more interesting subsequent scene of episode 1, season 1, nor is the consumer presented with a selection list of subsequent scenes of episode 1, season 1, while watching the current scene in full display screen mode. Current media content program selection options as well as media content segment selection options are rather inflexible and present certain noteworthy consumer inconveniences.

Various disclosed techniques herein identify suggested upcoming media content segments of a media content item for viewing on a display screen while currently displaying a media content segment of the media content item. In some embodiments, the media content display mode is a consumer choice, not a limited feature, and the order of upcoming segments is a consumer selection, not a provider decision. In some embodiments, upcoming segments are conveniently identified even in full display screen mode during the currently displayed media content segment without the necessity to switch modes to avoid consumer viewing disruptions. The currently displaying media content segment and information regarding upcoming (recommended) media content segments may be displayed simultaneously on a common display screen, the former displayed in considerably larger size than the latter to avoid consumer viewing experience degradation. In some cases, the system identifies upcoming media content segments in full display screen mode while continuing to display a current media content segment in full display screen mode. Analogously, a media content item (e.g., a movie or an episode) may be displayed while information regarding suggested subsequent media content items are displayed, both in full display screen mode.

In accordance with various embodiments disclosed herein, a method of automatically displaying subsequent recommended segments of a media content item on a display screen is disclosed. In some embodiments, the subsequent segments of the media content item be identified with corresponding identifiers that may themselves be displayed on the display screen with a current segment of the media content displayed simultaneously on the display screen. For example, while watching a particular scene from episode 1, season 1 of Game of Thrones on the display screen of a smartphone device, identifiers representing the next four key or interesting scenes of the same episode may be displayed. In some cases, identifiers of the upcoming suggested scenes are displayed simultaneously with the currently displayed scene on the smartphone or a non-portable device display screen.

The subsequent segments may be selected for display based on one or more preferences of a consumer profile. For example, the profile of a viewer may indicate action scenes in the series, Game of Thrones are favored over love scenes by the viewer, in which case, the system may display identifiers corresponding to one or more of the action scenes of episode 1, season 1 as opposed to displaying love scenes of episode 1, season 1. Alternatively, or additionally, the viewer may have historically frequented one or more particular types of scenes of a particular episode, such as love scenes, in which case, the system may display identifiers corresponding to detected subsequent love scenes of the currently displayed episode.

The segment identifiers may take on various forms. Continuing with Game of Thrones example above, the identifiers of episodes 2-6 of season 1 may be represented as thumbnails, tiles, or text messages on a device display screen. Identifier representations on the display screen may be symbols, icons or thumbnails indicative of the corresponding media content segment or media content item. For example, identifiers may be represented by a popular scene commonly known to followers of a corresponding series. Representative symbols, icons, and thumbnails of the identifiers may be instead or additionally based on consumer preferences. In some cases, the identifiers of subsequent segments may be displayed in a sequential order on the display screen. The segment identifiers may be displayed in an overlay section of the display screen. In some embodiments, the overlay section is smaller in size than the size of the display screen and its location on the display screen may be determined in a manner that interferes least with the currently displayed segment. For example, the identifiers may be displayed on a left-bottom location of the screen where the currently displayed images are sparse relative to the remainder of the display screen in a currently displaying action-packed scene.

At the conclusion of the current segment, the subsequent segments of the media content are displayed in a sequential order consistent with the sequential order in which the identifiers were displayed prior to the conclusion of the prior segment. With continued reference to the example of the Game of Thrones series, when a currently playing scene of episode 1 of season 1 ends, a first scene of episode 2 of season 1 automatically plays, followed by a second scene of episode 2 of season 1, and so on, consistent with corresponding previously displayed identifiers (e.g., identifiers of scene 1, episode 2, season 1, scene 2, episode 2, season 1, and so on), as described above.

In some cases, the number of displayed identifiers is based on the screen size of the display screen. For example, identifiers corresponding to three scenes from episodes 2-4 of season 1 of Game of Thrones may be visually clearly noticeable on an iPhone 11 Pro Max device display screen, whereas no more than one scene, such as scene 1, episode 2 of season 1, may be visually clearly noticeable on the display screen of an iPhone 11 device, because the screen size of the former device is larger than the screen size of the latter device. Additionally, the screen mode may optionally allow a user to select between displaying the current segment of the media content in a full display screen mode or a partial display screen mode of a media player while the segment identifiers are simultaneously displayed on the display screen.

In some embodiments, media content segments may have associated rankings and the associated rankings of subsequent segments may be determinative of the sequential order in which the subsequent segments are displayed. The system may adopt a relative ranking system or an absolute ranking system. For example, in the former case, the ranking of subsequent segments may be based on the level of consumer interest relative to the level of consumer interest in the remaining subsequent segments to be displayed. The identifiers of subsequent segments may be arranged for display on the screen in the order of the highest-ranked segment to the lowest-ranked segment (e.g., scene 3 of episode 1 of season 1 of Game of Thrones may be ranked higher than and played before scene 2 of episode 1 of season 1 of Game of Thrones; correspondingly, the identifier of scene 3 of episode 1 of season 1 is displayed in an order before the identifier of scene 2 of season 1 is displayed) or vice versa. In the case of absolute ranking, each of the scenes 2-6 of episode 1 of season 1 of Game of Thrones may have an assigned consumer interest score, for example, in the range of 1-10, with an interest score of 10 indicating the highest consumer interest and an interest score of 1 indicating the lowest consumer interest, or vice versa. Media content segment or media content item rankings may be weighed based on favored categories, for example.

In some embodiments, ranking is based on a trained machine learning model. For example, the model may be trained with consumer selection training data over time to learn the consumer's preferred selections. The trained model then forms the basis for determining the sequential order in which identifiers, and the corresponding order in which media content segments, are displayed on the display screen. In some cases, the model may be trained with communal data, data from multiple user selections, for example, users of a particular demography, gender, or age group.

The system may receive a request to rearrange the original sequential order (e.g., second scene of season 1, third scene of season 1, fourth scene of season 1, . . . ) and in response to the request, a rearranged sequential order (e.g., second scene of season 1, first scene of season 2, third scene of season 1, . . . ) may be generated. In some embodiments, the request may be a keyed input of a control device, remote or local to a media player device display screen with key entries for receiving user selection input; a touchscreen input of a media player device touch display screen sensitive to user movements or gestures; a voice command input through an input receiver, remote or local to a media player device display screen; or other types of user input receivers suitable for receiving a user (or consumer) request to rearrange the original sequential order and transmit the request for identifier display processing to the media player device.

In some cases, media content segments are identified by metadata detection. Media content may have associated metadata (e.g., embedded in the media content) that may be indicative of or used to determine subsequent segment identifiers. For example, Game of Thrones may have detectable metadata references at the beginning and/or end of particular scenes or at a predetermined number of frames (e.g., every 10 frames) within each episode, and in both cases, the segments may be identified based on the detected metadata and metadata references.

In some embodiments, the number of identifiers to be displayed on the display screen is based on a zoom factor of the display screen, where a greater zoom factor determines a lesser number of displayed segment identifiers, and vice versa. For example, a single identifier, representing a single subsequent scene, may be visibly displayed on a display screen with a 130% zoom factor, whereas up to three identifiers, representing up to three subsequent scenes, may be adequately displayed on a display screen with a 100% zoom factor.

In some embodiments, the remaining runtime of the media content is determined during the currently displayed media content segment and the identifiers to be displayed are based on the media content remaining runtime. The remaining runtime may determine whether the system displays identifiers of subsequent segments, the number of identifiers to be displayed, whether any subsequent segments remain to justify displaying associated identifiers on the currently displaying media content segment display screen, or a combination thereof. During the current segment display time, the system may determine that a remaining media content portion (e.g., runtime of a movie) of a media content item including the currently displayed media content segment is greater than a threshold period of time, and therefore the system displays subsequent segment identifiers of the currently displayed media content segment corresponding to the list of upcoming media content segments. Analogously, the system may determine, during the current segment display time, that the remaining media content item runtime is less than a threshold period of time; the system may then display subsequent segment identifiers of a different media content item altogether during the currently displayed media content segment or during a subsequently displayed media content segment. The system may determine to display identifiers of a different media content item than that which is currently displayed on the display screen because a short media content remaining runtime (based on a determination that the remaining runtime is less than a threshold time period) may not leave adequate time for displaying subsequent segments of the currently displayed media content or no further detectable segments of the currently displayed media content item may remain to be displayed. For example, when the last episode of the last season of Game of Thrones is near its end, based on a threshold runtime, the system may display identifiers corresponding to segments of another media content item altogether (e.g., segment identifiers of a Happy Potter movie.) In contrast, the system may determine to display identifiers of subsequent segments of the currently displayed media content because a longer media content runtime remains (e.g., the remaining media content runtime is greater than a threshold period of time) therefore leaving adequate time for displaying at least one remaining segment of the currently displayed media content item. In the case where a consumer of a particular media episode of a media content item has watched 10% of the media content with 90% of the content remaining to be watched, segment identifiers of subsequent segments of the same media content item may be displayed. In the case where the consumer has watched 90% of the media content item with only 10% of the content remaining, segment identifiers of an entirely different media content item may be displayed. In some cases, viewing segment identifiers of the currently display media content item or those of a different media content item may be presented for a viewer's choice.

In accordance with some disclosed embodiments, a method of automatically displaying subsequent media content items of a list of media content items on a display screen is disclosed. In some embodiments, a current media content item (e.g., a movie or an episode) is selected for display on the display screen. Subsequent media content items to be displayed on the display screen are identified. For example, the movies Pulp Fiction, Interstellar, and The Matrix may be identified from a list of subsequent movies to be played at the conclusion of the currently watched movie on a smartphone display screen. The list of subsequent media content items may be based on consumer profile preferences, as earlier discussed relative to media content segments, for example. In response to determining a threshold period of time remains for displaying the current media content item on the display screen (prior to its conclusion), identifiers of subsequent media content items are displayed in a sequential order simultaneously with the displaying of the current media content item on the display screen. With continued reference to the above example, identifiers for each of the movies The Matrix, Interstellar, and Pulp Fiction, may be displayed in the foregoing sequential order on a smartphone display screen simultaneously with the displaying of the currently watched movie. The sequential order may be rearranged in response to receiving a request to rearrange the sequential order of the identifiers, and at the conclusion of displaying the current media content item, the system may automatically display each of the subsequent media content items according to the rearranged sequential order of corresponding identifiers. The consumer may wish to rearrange the order of the upcoming movies from a prior order (e.g., The Matrix, followed by Interstellar, followed by Pulp Fiction) to a different order: Interstellar, followed by The Matrix, followed by Pulp Fiction. In response to receiving the request, the system rearranges the order of display of the identifiers of the movies accordingly.

In some embodiments, the system may receive a request to add or remove an identifier to or from the list of identifiers of subsequent content items. In response to receiving the request, the system may display identifiers that reflect the requested change to the identifiers instead of the original sequential order of identifiers. In the case of adding an identifier, the replacement identifier may be placed in a location in the list of rearranged identifiers like the location of the identifier being replaced in the original sequential order of identifiers. In the movie example above, the identifier corresponding to the movie The Matrix may be the first (upcoming) item in the original sequential list of identifiers corresponding to a movie queue of subsequent movie items to be displayed, and when the sequence in the list is rearranged, the identifier of the movie Interstellar may occupy the first place location in the sequential list of identifiers to be displayed, consistent with the first place location of the movie item The Matrix in the original (pre-rearrangement of the) sequential order of the identifiers.

Media content item identifiers, analogous to their counterpart media content segment identifiers, may take on similar features as the features of their counterpart media content segments, such as without limitation, the overlay, profile preferences, metadata, zoom, ranking, and runtime threshold features.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is, in some embodiments, directed to methods and systems for automatic display of representations of recommended (subsequent) media content segments on a display screen, and more particularly to simultaneous display of representations identifying the recommended media content segments on the display screen. The present disclosure is, in some embodiments, further directed to methods and systems for automatic display of representations of recommended (subsequent) media content items on a display screen, and more particularly to simultaneous display of representations identifying the recommended media content items on the display screen.

Figure 1:
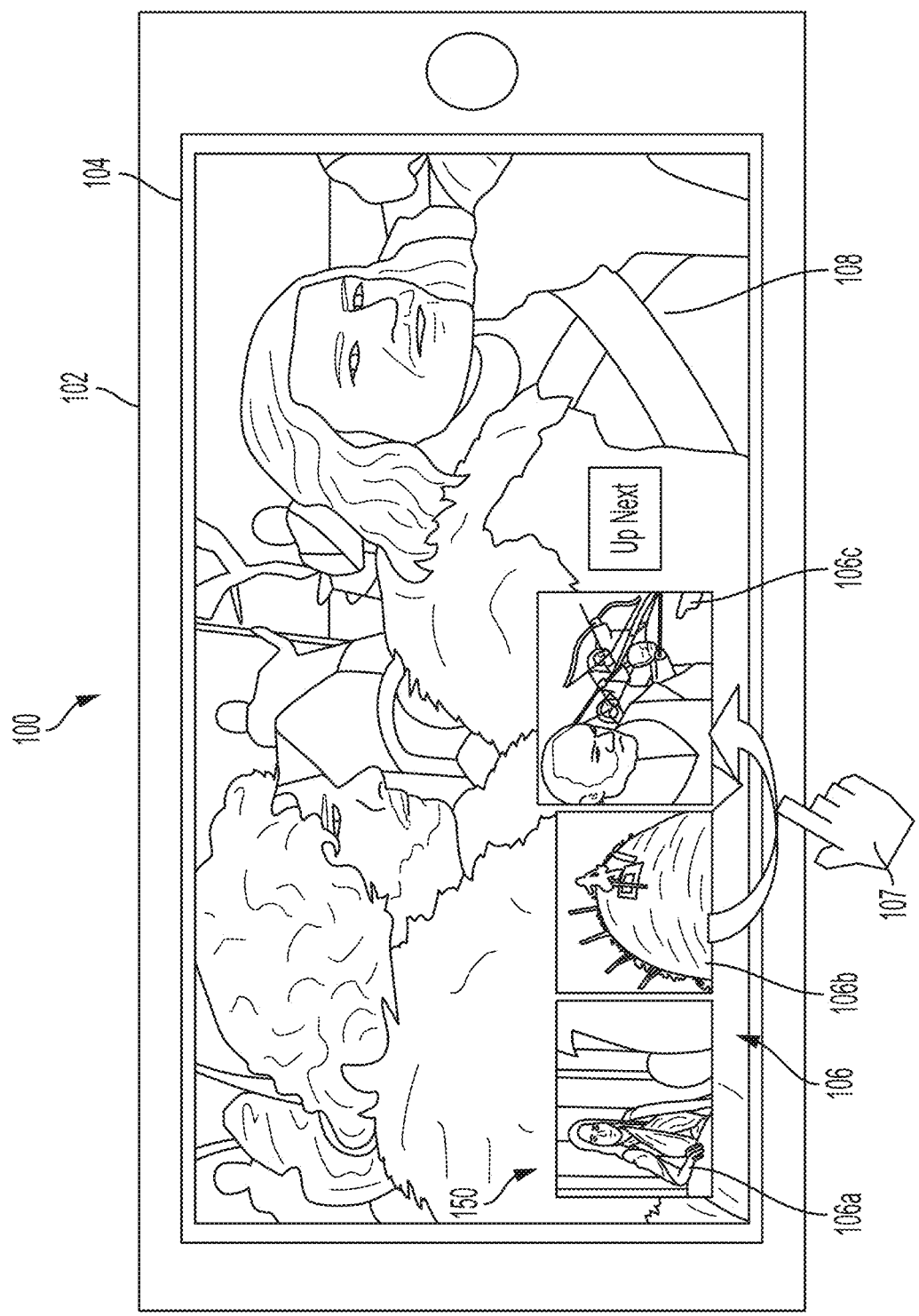
FIGS. 1-6 each show an illustrative diagram of a media content display system, in accordance with some embodiments of the disclosure.

FIG. 1 shows an illustrative diagram of a media content display system 100, in accordance with some embodiments of the present disclosure. In some embodiments, system 100 performs processing and displaying operations of subsequent media content segment identifiers on a display screen of a consumer computer device (e.g., smart televisions, laptops, desktops, and tablets) or a consumer handheld device (e.g., smartphones).

In an embodiment of the disclosure, system 100 is shown to include a consumer device 102 equipped with a consumer device display screen 104. Consumer device 102 may be any consumer electronic device configured to process media content identification for display of media content identifiers and media content items on an incorporated or externally located display screen in a full display screen mode. While not shown, consumer device 102 may be configured for wired or wireless communication to remote devices, as further discussed relative to FIGS. 6 and 10 herein. In some embodiments, consumer device 102 may be configured as a computing device, as shown and discussed relative to a computing device 104 of FIG. 10. Consumer device 102 may be a computer device, such as, without limitation, a laptop or a tablet. In some embodiments, consumer device 102 may be a consumer handheld device, such as, without limitation, a smart phone.

Figure 10:
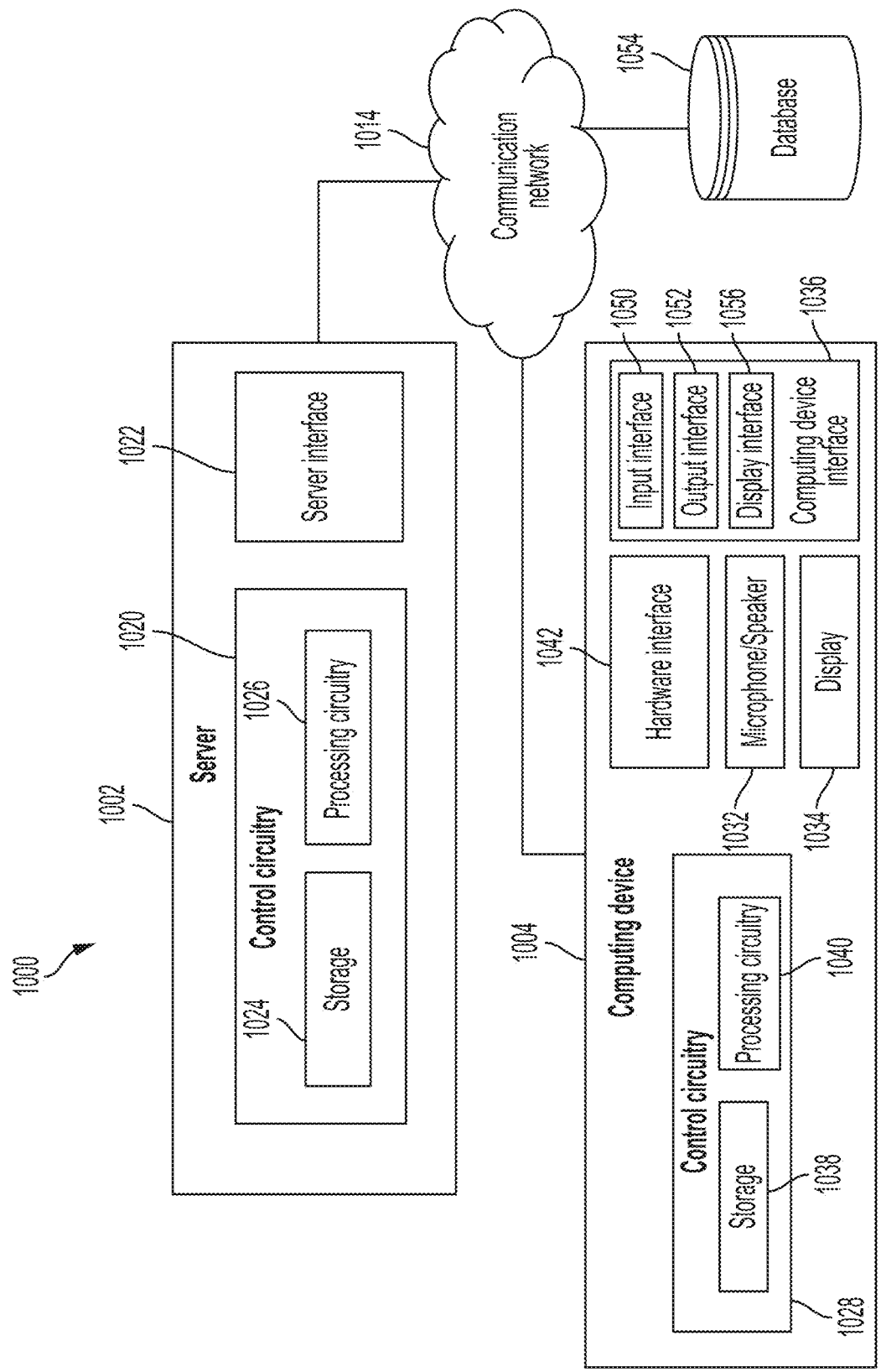
FIG. 10 is a block diagram of an illustrative system for performing media content display processes, in accordance with some embodiments of the present disclosure.

Consumer device display screen 104 displays media content 108 under the direction of a processor, such as processing circuitry, executing software program code to implement display processing operations. For example, consumer device display screen 104 may display media content 108 under the direction of processing circuitry 1040 of computing device 1004 executing program code stored in storage 1038, as shown in FIG. 10. Display operations acting on display screen 104 may be implemented by execution of software (e.g., virtual machine), hardware, or a combination. Display screen 104 is shown, in FIG. 1, to be wholly incorporated in consumer device 102, but display screen 104 need not be a part of consumer device 102. In some cases, display screen 104 may be remotely coupled to, wirelessly or by wire, to consumer device 102.

A consumer of consumer device 102 may interact with the consumer device to, for example, cause the consumer device to display certain information on the display screen, through input and output interfaces. In some embodiments, the consumer may enter information to cause display screen 104 to display media content (e.g., media content item 108) selected through one or more corresponding media content identifiers via haptic input, such as a touch gesture input, on the display screen. For example, display screen 104 may be a touchscreen display and a user touch gesture or movement (e.g., a finger gesture 107) across the display screen may be an input input to processing circuitry of consumer device 102, from the display screen. In some embodiments, consumer input may be received through a consumer keyboard. For example, a consumer may rearrange a media content selection through pop-up keyboard entries, such as via a pop-up keyboard 610 shown in FIG. 6, to indicate a consumer media content selection rearrangement affecting the arrangement sequence of corresponding upcoming media content identifiers. Consumer display selection may be consummated in manners other than keyboard entry input or haptic input. For example, a consumer media content arrangement selection of upcoming media content may be provided by a curser input, a text input, a voice command input, or implemented in other suitable manners of inputting consumer selection including receiving consumer (or user) selected preferences, or other media content-related operations.

In FIG. 1, media content item 108 is shown in full display screen mode on display screen 104. That is, media content 108 occupies most, if not all, of the image-displayable screen area of display screen 104. Media content 108 may be displayed in a partial display screen mode, on a display screen area smaller than a full-size display screen area with images occupying less than most of the image-displayable part of the display screen.

In some embodiments, a current segment of a media content item may be displayed on display screen 104. For example, media content item 108 may be a media content segment, such as a scene or a frame of a media content item (e.g., a movie or a series episode). While the media content segment (e.g., a scene from a particular episode of Game of Thrones) is currently displayed, identifiers 106 identifying upcoming (or "Up Next") media content segments may be identified and displayed on display screen 104. For example, while a particular scene or frame from a particular episode of Game of Thrones, is displayed on display screen 104, identifiers 106 which identify subsequent recommended scenes in the remaining runtime of the same episode of Game of Thrones may be displayed. In some cases, the identifiers are a shorthand or thumbnail representation of corresponding media content segments. For example, an identifier may be a frame from a famous, recognizable, or popular scene. Identifiers are generally smaller in size than the displayed media content segment to prevent visual distractions while the consumer is viewing the displayed media content segment.

In the example embodiment of FIG. 1, identifiers 106 include a set of 3 identifiers, 106a, 106b, and 106c, although a different number of identifiers (more than 3 or fewer than 3) may be displayed. Identifiers 106 are typically sequentially displayed on display screen 104. Identifiers 106c, 106b, and 106a may be displayed in a specific sequential order or in a random order. Identifiers 106a, 106b, and 106c may be rearrangeable. With a finger gesture 107 across display screen 104, a user may rearrange the order of identifiers 106b and 106c, for example.

Identifiers 106 may be represented in any suitable form and shape on display screen 104. For example, identifiers 106 may be represented by symbols, icons, avatars, and in the shape of tiles (or thumbnails) such as shown in the embodiment of FIG. 1, or circles. Identifiers 106 may be represented as text, with bar graphs, or any combination thereof, and in any other suitable form or in any other suitable shape (e.g., diamonds) of screen representation.

In some embodiments, identifiers 106 may be scattered on display screen 104, randomly or in a pattern. In embodiments with identifiers 106 displayed collectively on an overlay section of display screen 104, identifiers 106 may be displayed in an overlay section 150 of display screen 104, at a location of the screen with sparse images or at a blocked-out image portion of the screen. In FIG. 1, overlay section 150 appears at a location of display screen 104 with a partial image of a fur coat that extends beyond the overlay section. The area of display screen 104 blocked out by overlay section 150 (behind overlay section 150) does not have a significant effect on the viewing experience of the consumer. The blocked-out area offers no relevant or meaningful information regarding the displayed scene that may be lost on a consumer of the scene.

In some embodiments, a processing circuitry, for example and without limitation, processing circuitry 1040 of FIG. 10, identifies identifiers 106 of subsequent (recommended) media content segments of the remaining runtime of media content 108 for display on display screen 104. Identifiers 106 may be determined based on one or more preferences of a profile. For example, a consumer profile may be indicative of likely consumer interest in particular subsequent segments of a particular media content item. The consumer profile-based segments may be of particular interest to a consumer. For example, device 102 may identify the subsequent segments based on the historical frequency with which the consumer has consumed certain segments during a particular time period. Additionally, or alternatively, the sequence of subsequent segments may be determined by a consumer profile preference based on favored media content segments or historically popular consumed segments. Device 102 may identify identifiers 106, the display sequence of the identifiers, or both based on consumer media content profile preferences.

Metadata is yet another basis for media content segment identification. Metadata is descriptive information embedded in and associated with a corresponding media content item (e.g., media content item title, media content item artist, and so forth). In some cases, the metadata of a video (e.g., movie or episode) may include data that varies across time and is synchronized with frames of the video for ease of access to the video images. In embodiments with segments identified based on frames, system 100 may identify media content segments by determining corresponding metadata.

At the conclusion of the segment currently displayed by display screen 104, segments corresponding to identifiers 106 are automatically played on display screen 104. For example, the subsequent segments of the currently displayed episode of Game of Thrones corresponding to identifiers 106a-106c may be played on display screen 104 in the sequential order specified by the associated identifiers. For example, the media content segment corresponding to identifier 106c may be "Up Next" and displayed next, followed by the segment corresponding to identifier 106b, followed by the segment corresponding to identifier 106a. As discussed earlier, the consumer may rearrange the order of the identifiers by, for example, swapping identifiers 106b and 106c, which causes device 102 to swap the order in which the segments are displayed at the conclusion of the currently displayed segment, for example. In the example embodiment of FIG. 1, after rearrangement, the next displayed segment, Up Next, is the segment corresponding to identifier 106b instead of the segment corresponding to identifier 106c, followed by the segment corresponding to identifier 106c.

In some embodiments, segments may have associated rankings based on certain preferences, and the sequential order of subsequent segments to be displayed on display screen 104 may be based on corresponding rankings of the subsequent segments. Correspondingly, identifiers of the ranked segments may be arranged sequentially for display on display screen 104 according to the segment rankings. For example, identifiers of media content segments with higher rankings may be first or higher in the order of display on display screen 104 relative to identifiers of media content segments with lower rankings. Rankings may be relative or absolute. Rankings of subsequent segments may be a consumer choice (customized) or determined based on a consumer profile preference or trained machine learning, as further discussed relative to FIG. 6. In some cases, the sequential order of identifiers on display screen 104 may be based on weighted rankings. For example, segment rankings may be weighted based on movie content segment type, e.g., action scene segments may be higher-weighted relative to love scene segments based on consumer preferences.

In the embodiment of FIG. 1 and those to follow, the consumer conveniently consumes the currently displayed media content 108 segment in full display screen mode while viewing identifiers of upcoming recommended segments for media content comparison in real time and without necessitating switching to partial display screen mode. While watching the currently displayed Game of Thrones segment, for example, a consumer may decide the segment is not of interest or that a subsequent segment, as identified by one of the identifiers 106, appears more appealing. The consumer is provided the option to discontinue watching the current segment to conclusion and switch to the more interesting segment.

Figure 2:
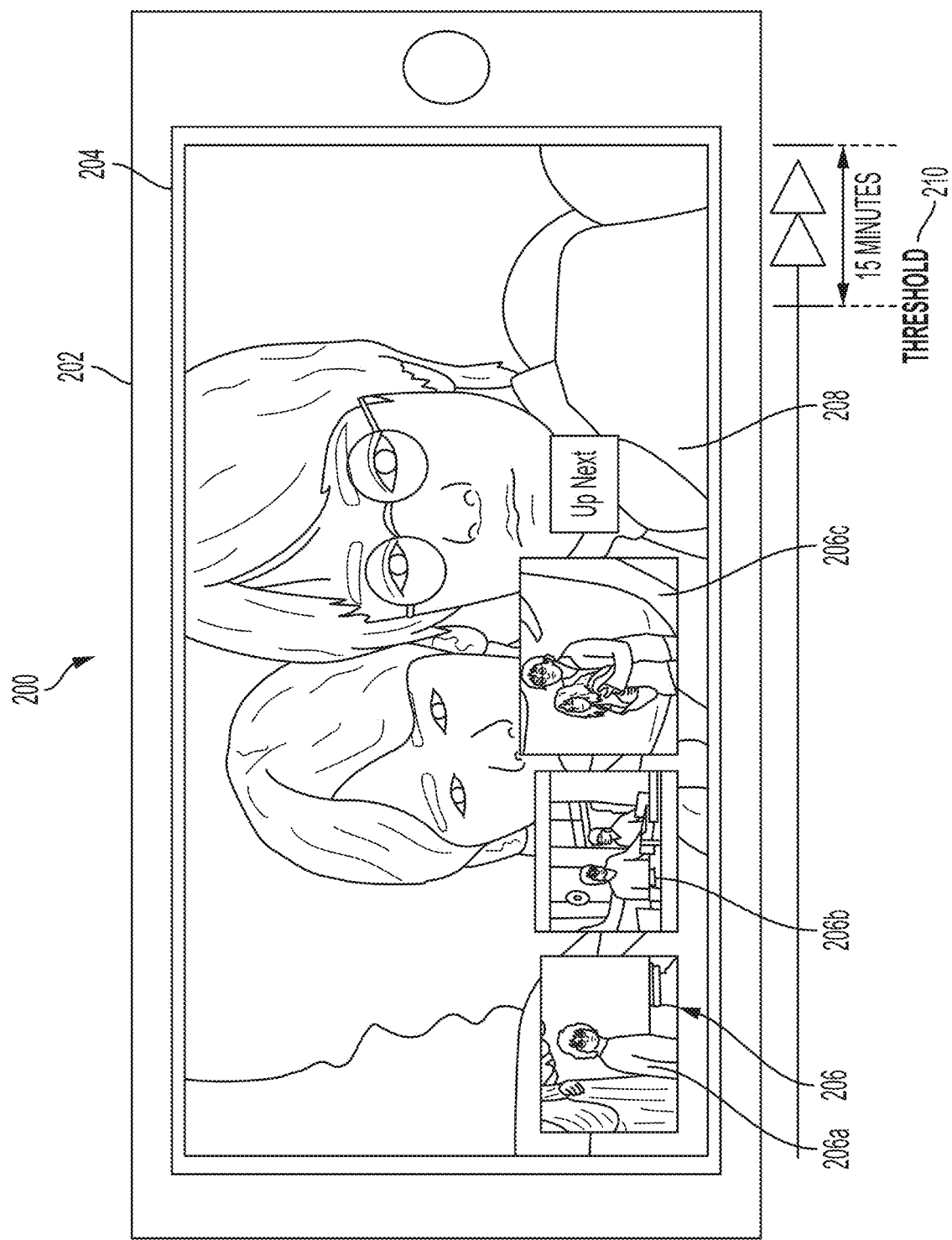

In some embodiments, system 100 may determine the remaining runtime of a currently displayed media content item and may further determine that the remaining runtime is above a threshold period of time, in which case, the system may take certain action, or not. With reference now to FIG. 2, an illustrative diagram of a media content display system 200 is shown, in accordance with some embodiments of the present disclosure. In some embodiments, system 200 is configured analogously to system 100 of FIG. 1. System 200 need not be configured analogously to system 100 of FIG. 1. For simplicity of illustration, in FIG. 2 and the figures to follow, the media content display system of each figure's embodiment, such as system 200, is presumed configured as system 100's unless otherwise stated and/or shown herein.

In an embodiment of the disclosure, system 200 includes a consumer device 202 equipped with a consumer device display screen 204, as shown in FIG. 2. Display screen 204 currently displays a segment of a media content item 208 (e.g., a segment of the Harry Potter movie series) in addition to identifiers 206, 206a, 206b, and 206c, identifying respective subsequent recommended segments of the same media content item (e.g., same episode), similar to identifiers 106 of FIG. 1. In the embodiment of FIG. 2, system 200 determines a runtime of a subsequent recommended segment (e.g., runtime of a segment from the same Harry Potter movie, identified by identifier 206c) of the media content item while displaying the subsequent segment (e.g., during display of the segment corresponding to identifier 206c).

In response to determining the remaining runtime of the current media content item, displaying a subsequent segment of the current media content item is below a threshold 210 period of time during the subsequent segment (e.g., segment identified by identifier 206c), the system displays one or more identifiers of segments of other media content different from media content 208 (e.g., a movie of Harry Potter other than the current movie of Harry Potter) and automatically displays corresponding segments of the other media content at the conclusion of the subsequent segment of the current media content. For example, if the system determines during the displaying of the next subsequent segment, the segment identified by identifier 206c, that the runtime of the currently displaying Harry Potter movie is shorter than threshold 210, rather than automatically displaying the next segment of the same Harry Potter movie, the system displays a segment of a different movie of the Harry Potter movie series. In some embodiments, the remaining runtime determination is made during the displaying of the current rather from the subsequent segment, and identifiers of segments of the other media content item (different than media content item 208) are displayed during the current segment.

Threshold 210 may be based on a period of time remaining to be displayed, as discussed above. In some embodiments, threshold 210 may be based on the period of time the segment has been displayed. Threshold 210 may be based on a measure other than time. For example, in some embodiments, threshold 210 may be based on the number of frames displayed or the number of frames remaining to be displayed of a particular media content segment or of the total media content item. Threshold 210 may be based on any suitable measure of progress of a media content segment or a media content item.

Figure 3:
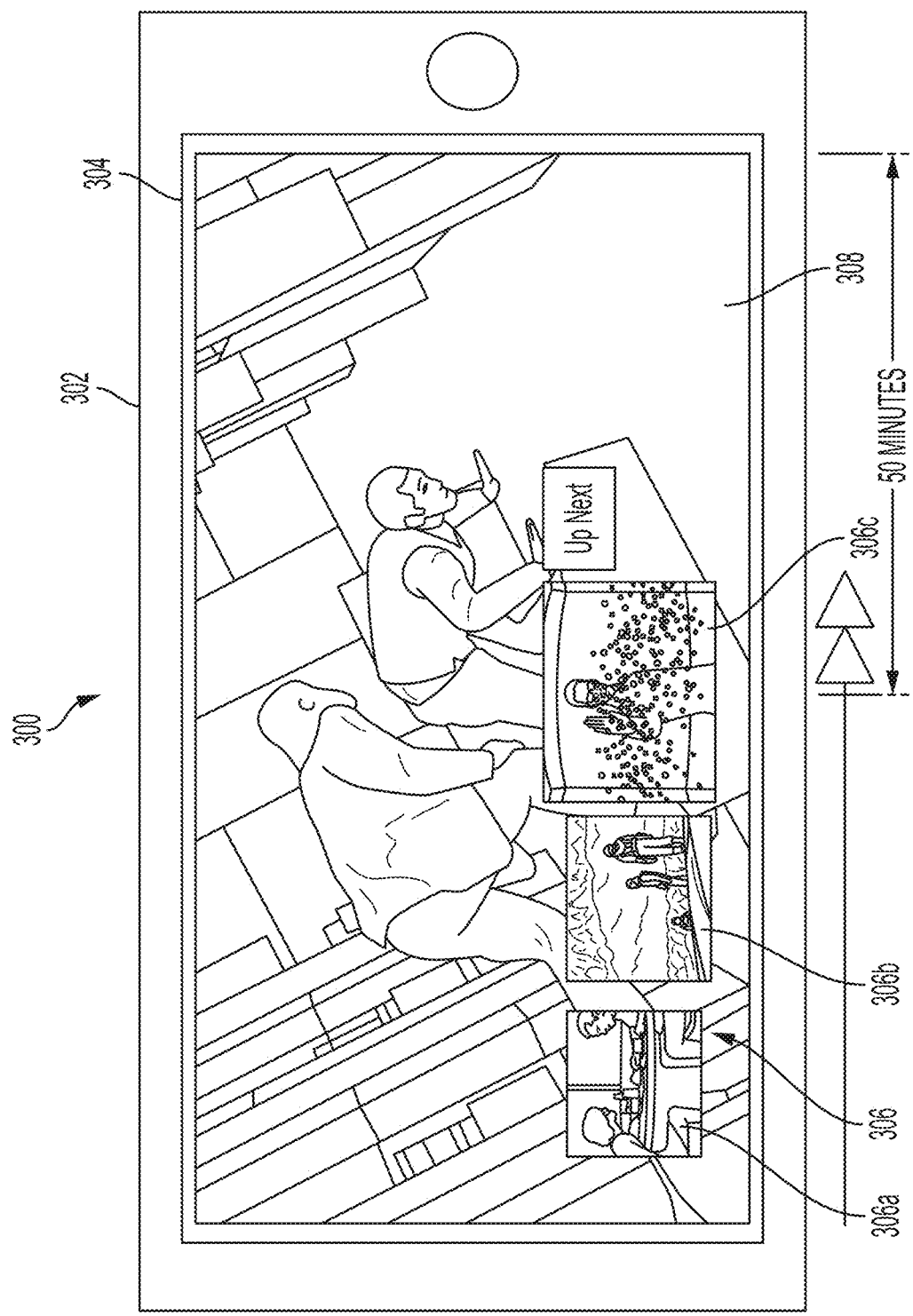

In some embodiments, identifiers need not necessarily correspond to media content segments, for example, scenes of an episode or a movie, and can instead correspond to whole media content items, for example, an episode or a movie, as discussed in the example embodiment of FIG. 3 to follow.

FIG. 3 shows an illustrative diagram of a media content display system 300, in accordance with some embodiments of the present disclosure. In some embodiments, system 300 is configured analogously to respective systems 100, 200 of FIGS. 1, 2, with noted exceptions shown in FIG. 3 and as discussed below. System 300 need not be configured analogously to systems 100, 200 of FIGS. 1, 2. But for simplicity of illustration and discussion, system 300 is presumed similar to systems 100, 200 unless otherwise stated and/or shown herein. For example, whereas systems 100 and 200 each facilitate displaying media content segment (e.g., a scene in an episode) identifiers, system 300 facilitates displaying media content item (e.g., an episode) identifiers.

In an embodiment of the disclosure, system 300 includes a consumer device 302 equipped with a consumer device display screen 304, as shown in FIG. 3. Display screen 304 currently displays media content item 308 (e.g., the 2010 movie Inception) in addition to identifiers 306 (306a, 306b, and 306c) identifying respective subsequent recommended media content items (e.g., identifiers 306a, 306b, and 306c of respective movies Pulp Fiction, Interstellar, and The Matrix). Each of the identifiers 306 uniquely identifies a corresponding media content item recommended for display at the conclusion of the currently displayed media content item, similar to identifiers 106, 206 of respective FIGS. 1, 2, but for recommended media content items rather than for recommended media content segments.

In the embodiment of FIG. 3, system 300 displays a current media content item 308 on display screen 304 and identifies subsequent media content items 306. When there is a threshold 310 period of time remaining for displaying the current media content item 308 on display screen 304, system 300 displays identifiers 306 in a sequential order (e.g., 306c, 306b, and 306a) that identifies the subsequent media content items (e.g., The Matrix, Interstellar, Pulp Fiction), respectively. For example, in FIG. 3, a period of 50 minutes may remain till the conclusion of media content item 308 and the threshold may be 15 minutes. Because the 50-minute remaining time period of the media content item 308 is greater than the predetermined threshold of 15 minutes, system 300 may determine to display identifiers 306; otherwise, if, for example, a shorter runtime remains, like 2 minutes, system 300 may determine not to display identifiers 306 because there may not be adequate time for displaying the identifiers or because no identifiers identifying subsequent recommended media content items remain. Threshold 310 may be determined based on one or more factors relevant to the particular characteristics of the media content item, such as without limitation, the media content item runtime, consumer media content consumption history, or both. For example, threshold 310 may be determined based on the total runtime of media content item 308. Analogously to the embodiments of FIGS. 1, 2, threshold 310 may be based on a measure other than time.

In some embodiments, system 300 may, simultaneously with displaying the current media content item 308 (e.g., Inception), display identifiers 306 on display screen 304. The sequential order of identifiers 306 may be rearrangeable, as shown and discussed in further detail relative to FIG. 4. As with the embodiments of FIGS. 1, 2, system 300 displays identifiers 306 and the currently displayed media content 308 in a full display screen mode of consumer device 302, enhancing the consumer experience by facilitating convenient comparison of the media content item being consumed (e.g., the movie Inception) and those that are identified as candidates to be consumed (e.g., The Matrix, Interstellar, Pulp Fiction).

Figure 4:
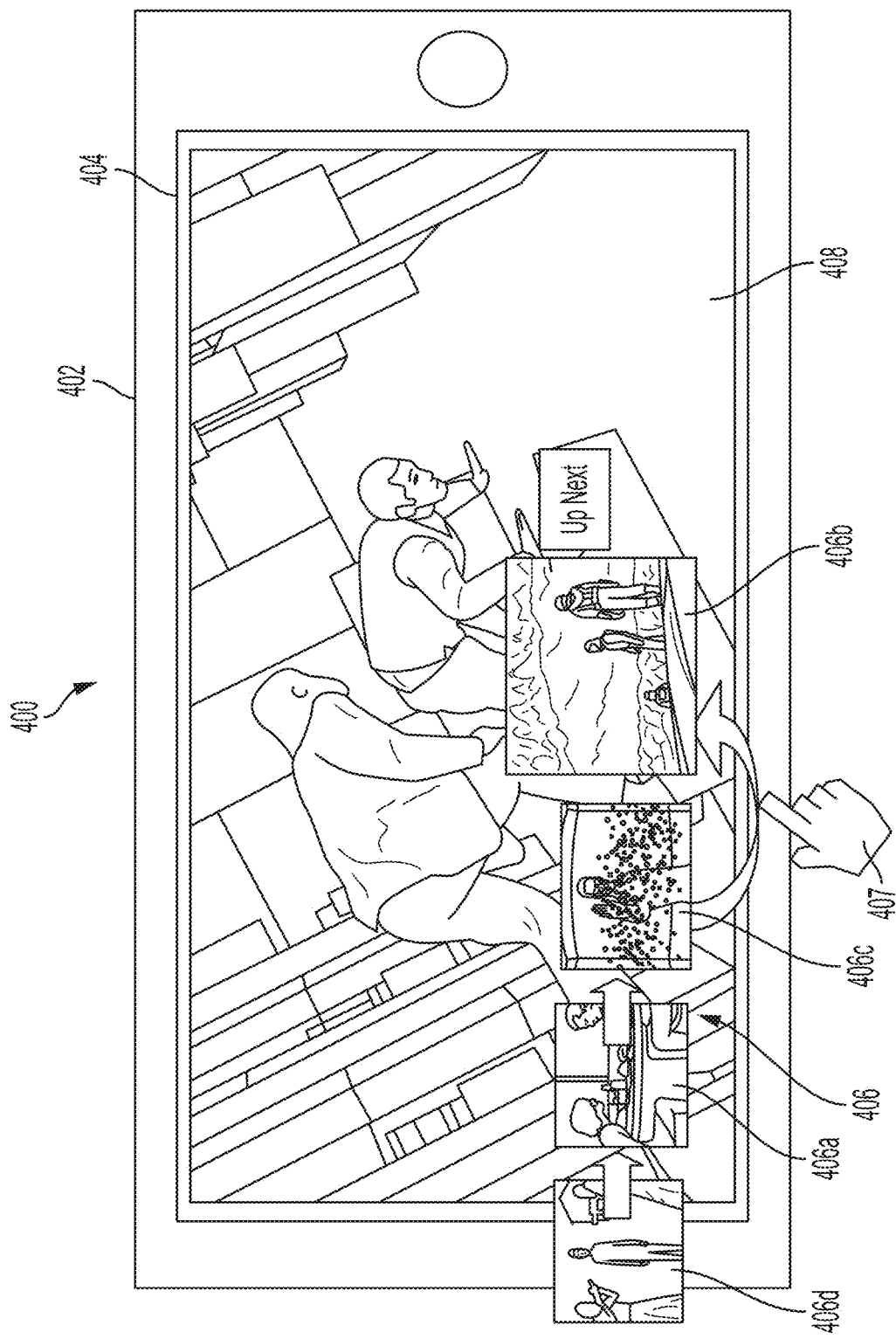

In some embodiments, similar to the respective systems of embodiments of FIGS. 1, 2, the system 300 of FIG. 3 provides the option for receiving a consumer request to rearrange the sequential order of identifiers 306 and, in response to receiving the request, system 300 displays, on display screen 304, identifiers 306c, 306b, 306a, in a rearranged sequential order, further shown and discussed relative to FIG. 4. At the conclusion of the current media content item 308, system 300 automatically displays each of the subsequent media content items (e.g., The Matrix, Interstellar, Pulp Fiction), identified by identifiers 306c, 306b, 306a, in the rearranged sequential order.

FIG. 4 shows an illustrative diagram of a media content display system 400, in accordance with some embodiments of the present disclosure. In some embodiments, system 400 is configured analogously to respective systems 100, 200, 300 of FIGS. 1, 2, 3, with noted exceptions shown in FIG. 4 and as discussed below. System 400 need not be configured analogously to systems 100, 200, 300 of FIGS. 1, 2, 3. But for simplicity of illustration and discussion, system 400 is presumed to be similar to systems 100, 200, 300 unless otherwise stated and/or shown herein.

System 400 displays media content item 408 (e.g., the movie Inception) on a display screen 404 of a consumer device 402. While media content item 408 is displayed, subsequent recommended media content items are identified. In some embodiments, if a threshold period of time remains for displaying the current media content item on display screen 404, system 400 determines to display a sequential order of identifiers 406 (406c, 406b, 406a) that identify the subsequent recommended media content items (e.g., The Matrix, Interstellar, Pulp Fiction), respectively. System 400 then simultaneously displays identifiers 406 with the displaying of the current media content item 408 (e.g., Inception) on display screen 404 in full display screen mode, as shown in FIG. 4.

As discussed earlier relative to prior figures, the sequential order of identifiers 406 may be rearrangeable. The consumer of device 402 may rearrange the existing sequential order of recommended media content items. In some embodiments, device 402 rearranges the existing sequential order of recommended media content items pursuant to a received consumer request, as earlier discussed. For example, the consumer may wish to add one or more media content items to the existing list (or queue) of recommended media content items identified by sequentially ordered identifiers 406 (e.g., 406c, 406b, 406a), not shown in FIG. 4. Or the consumer may wish to remove or replace one or more media content items from the existing list of recommended media content items identified by sequentially ordered identifiers 406 (e.g., 406c, 406b, 406a). In response to system 400 receiving a rearrangement request to change the existing order of media content items identified by identifiers 406c, 406b, 406a to a new order of media content items identified by identifiers 406b, 406c, 406a, effectively swapping the positions of the first and second media content items in the queue of upcoming recommended media content items, system 400 displays identifiers 406 in the rearranged sequential order (e.g., 406b, 406c, 406a), in accordance with the requested rearrangement. In some embodiments, the consumer request is a finger gesture input on the display screen, such as shown by a finger gesture 407 in FIG. 4. At the conclusion of the current media content item 408 (e.g., Inception), system 400 automatically displays each of the subsequent media content items according to the rearranged sequential order of the identifiers (e.g., Interstellar, The Matrix, Pulp Fiction). In some embodiments, system 400 displays the subsequent media content items on display screen 404.

In some embodiments, system 400 may display the subsequent media content items on a display screen other than display screen 404. For example, system 400 may display the subsequent media content items on a display screen communicatively coupled to device 402, wirelessly or through wire. In some cases, system 400 may display one or more of the subsequent media content items on a display screen other than display screen 404 and display the remaining subsequent media content items on display screen 404.

In some embodiments, system 400 receives a request to remove a media content item corresponding to one of the identifiers 406a, 406b, or 406c and to replace the removed media content item with a new media content item, not yet a part of the media content item queue of subsequent media content items to be displayed, and at a location in the queue that is different from (not like) the former location of the removed media content item in the queue. For example, system 400 may receive a request to remove a media content item (e.g., The Matrix) identified by identifier 406c, in a position second only to the position of the media content item (e.g., Interstellar) identified by identifier 406b, and to add a new media content item (e.g., the 2002 movie the Equilibrium) identified by new identifier 406d. The new media content item is to be added in a position (the third position in the queue) unlike the position of the content item it is replacing (the second position in the queue). Responsive to the consumer request, system 400 displays identifiers 406 corresponding to media content items reflecting the requested rearranged sequential order, i.e., the removal of existing identifier 406c corresponding to the media content item, The Matrix, shifting of the media content item (e.g., Pulp Fiction) corresponding to identifier 406a from a third position in the queue to a second position in the queue, and adding the new media content item (e.g., Equilibrium) corresponding to identifier 406d to the third position in the queue. At the conclusion of displaying the current media content item (e.g., Inception), the subsequent recommended movies Interstellar, Pulp Fiction, and Equilibrium are displayed, in the rearranged sequential order of their respective identifiers, 406b, 406a, 406d.

System 400 may display identifiers in the requested rearranged media content item order, on display screen 404. Alternatively, or additionally, system 400 may bypass displaying identifiers of the media content items in their original sequential order (pre-rearrangement), and only display the identifiers in their rearranged configuration. For example, if the consumer request is not received until after displaying identifiers 406 in their original sequential order, system 400 may initially display identifiers 406 in their original sequential order followed by displaying identifiers 406 in their rearranged sequential order, and if the consumer request is received prior to displaying identifiers 406 in their original sequential order, system 400 may display identifiers 406 in their rearranged sequential order without displaying identifiers 406 in their original sequential order.

In some embodiments, the order of media content items in the queue may be customized by the consumer or automatically generated by system 400 based on consumer profile preferences, ranking, or machine learned, as further discussed below. In some embodiments, system 400 may automatically rearrange an original order of sequentially ordered identifiers based on a pattern. For example, the consumer may wish to consume the media content items in the queue on a round robin basis, such as to repeat consuming a series of movies in a round robin fashion. For example, system 400 may include an input button or other similar selection features, for receiving a consumer input to device 402, in particular a selection for repeating a designated series of movies on display screen 404. In this case, assuming the movies are identified by identifiers 406b, 406c, 406a, and 406d and to be rotated for consumption in a round robin fashion, system 400 may automatically, without consumer intervention, display the movies in the sequential round robin order of 406b, 406c, 406a, 406d, 406b, 406c, 406a, 406d, 406b, 406c, 406a, 406d, and so on. The number of times a series of media content items is repeated may be alternatively, or additionally, accommodated by another selection feature of display 404.

Figure 5:
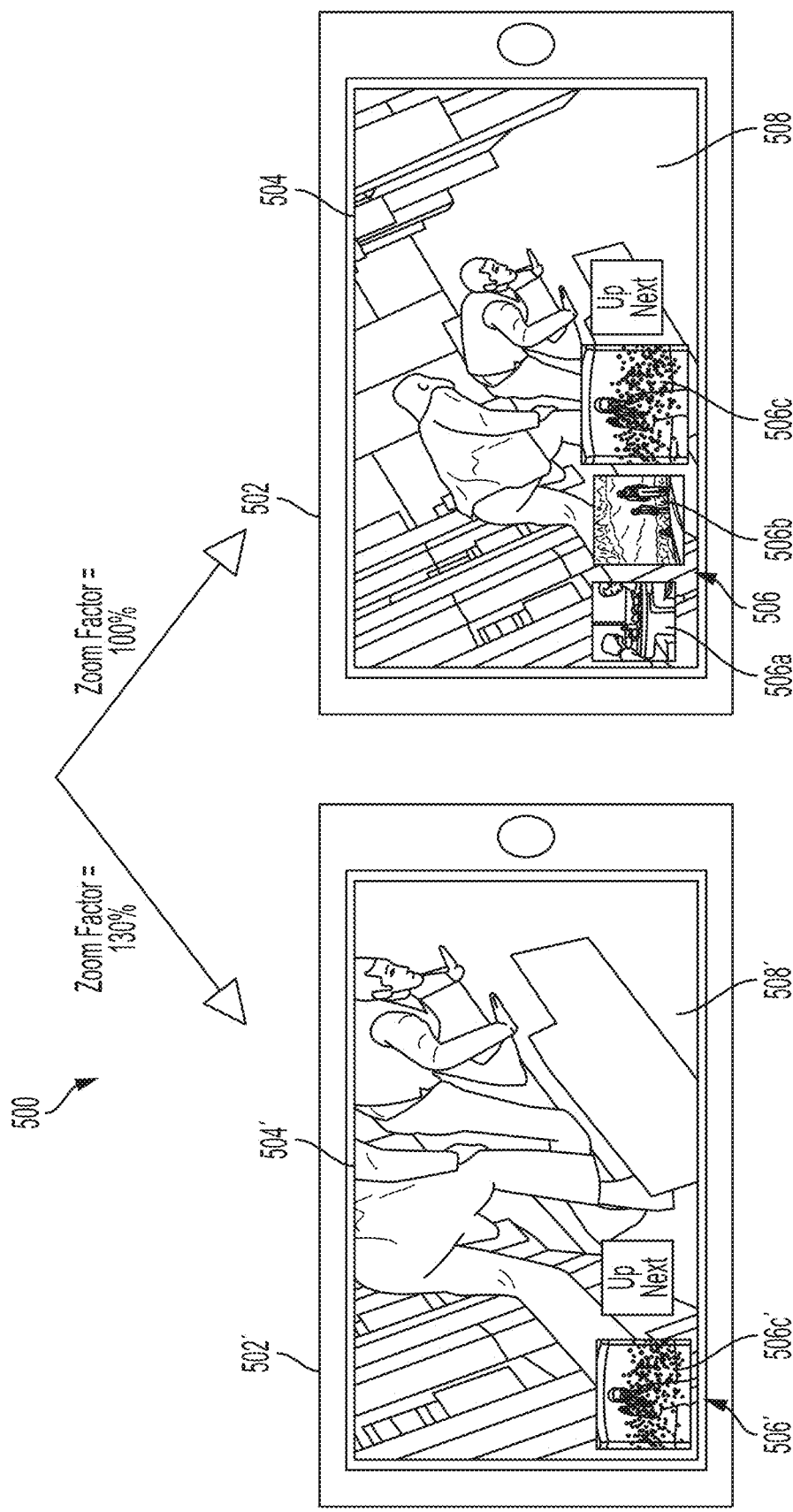

In some embodiments, the number of identifiers to be displayed on a display screen is based on a zoom factor of the display screen. FIG. 5 shows an illustrative embodiment of a media content display system 500, in accordance with some embodiments of the present disclosure. In some embodiments, system 500 is configured analogously to respective systems 100, 200, 300, 400 of FIGS. 1, 2, 3, 4 with noted exceptions shown and described relative to FIG. 5, as discussed below. System 500 need not be configured analogously to systems 100, 200, 300, 400 of FIGS. 1, 2, 3, 4. For simplicity of illustration and discussion, system 500 is presumed configured similarly to each of systems 100, 200, 300, 400 unless otherwise stated and/or shown herein.

In FIG. 5, system 500 displays media content item 508 (e.g., the movie Inception) on a display screen 504 of a consumer device 502. The zoom factor of display screen 504—a factor by which an image is displayed with greater detail relative to an original presentation of the image on a display screen—is 130%. With a zoom factor of 130%, system 500 can comfortably and visibly fit three identifiers onto the screen, whereas with a zoom factor of 100%, as shown by a zoomed version of display screen 504, at display screen 504', only one of the identifiers, identifier 506c', may be visibly comfortably displayed on display screen 504' to the consumer. As earlier noted, a device display screen size may also be determinative of the number of displayed identifiers.

Figure 6:
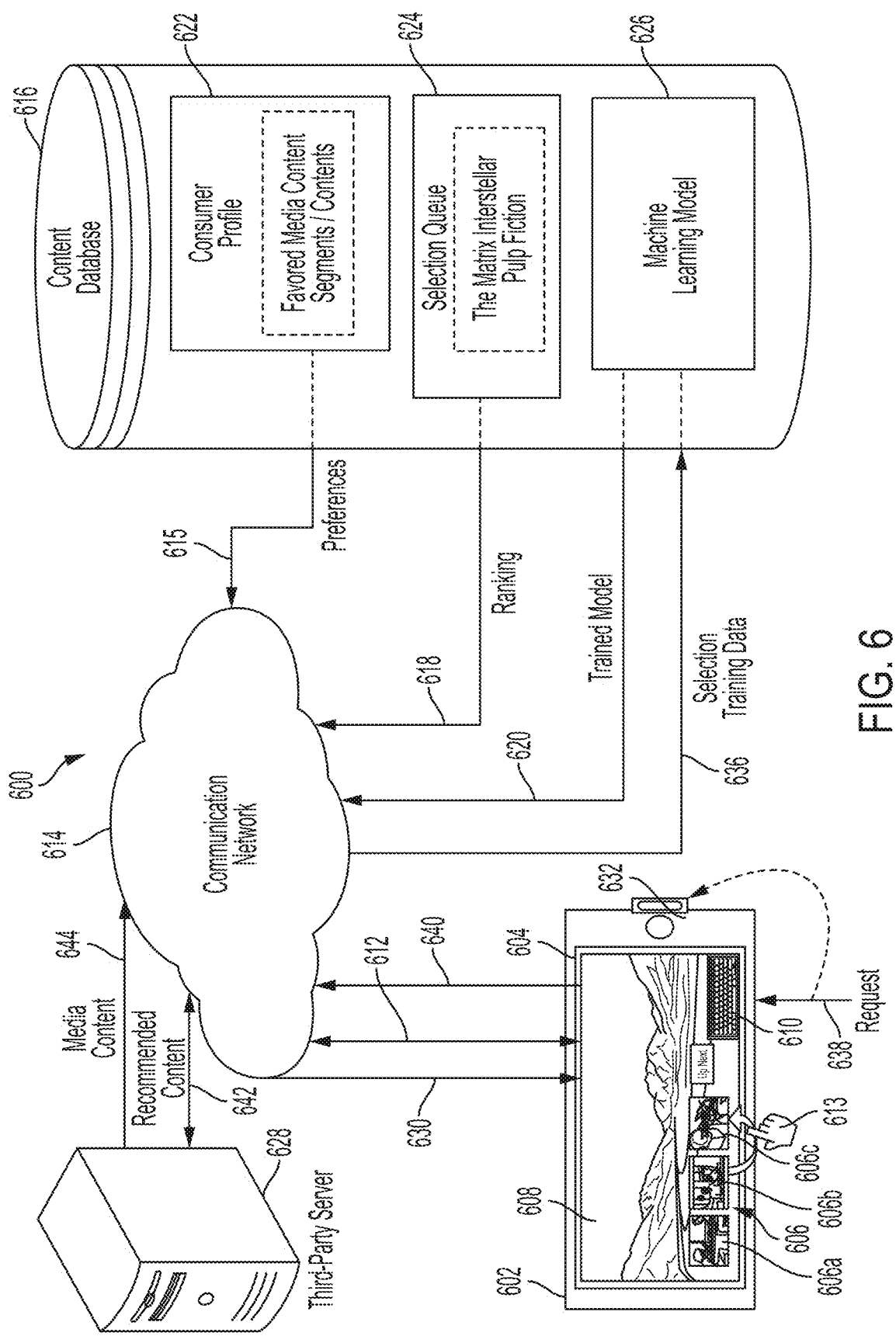

FIG. 6 shows an illustrative block diagram of a media content display system 600, in accordance with some embodiments of the present disclosure. System 600 generally facilitates the processing and displaying of media content segments and corresponding segment identifiers, and media content items and corresponding identifiers, in accordance with various embodiments of the disclosure.

System 600 is shown to include a consumer device 602, a content database 616, a third-party server 628 and communication network 614. In some embodiments, device 602 may be configured analogously to respective devices 102, 202, 302, 402, and 502 of FIGS. 1, 2, 3, 4, and 5 with noted exceptions as may be shown or discussed below relative to FIG. 6. Device 602 need not be configured analogously to devices 102, 202, 302, 402, and 502. Device 602 may be any consumer device suitable for carrying out the media content processing and displaying of the various embodiments of the disclosure. But for simplicity of illustration and discussion, device 602 is presumed similar to devices 102, 202, 302, 402, and 502 unless otherwise stated and/or shown herein.

Device 602 is shown to include a display screen 604 currently displaying a media content item 608. Further displayed on display screen 604 are identifiers 606 (606a, 606b, 606c), arranged in a sequential order according to the order in which corresponding media content items are to be displayed at display screen 604, at the conclusion of the currently displayed media content item 608. Device 602 is further shown to include a pop-up keyboard 610 and an audio receiver 632 for receiving requests, such as a consumer request 638, by keyboard entry input or voice command input, respectively. While not shown in FIG. 6, it is understood that request 638 may be received through alternative input interface, such as by a curser input or a touchscreen input, as earlier discussed. In some embodiments, audio receiver 632 may be a microphone. For example, audio receiver 632 may be a microphone feature of microphone/speaker circuitry 1032 of FIG. 10. Device 602 may further receive consumer input through a touchscreen gesture, such as shown at 613 in FIG. 6, for example, for effecting rearranging the sequential order of identifiers 606.

Communication network 614 may be a wide area network (WAN), a local area network (LAN), or any other suitable network system. Communication network 614 may include one or more network systems. For example, communication network 614 may include a WAN and a LAN, two or more LANs, two or more WANs, or a combination thereof. In some embodiments, communication network 614 and device 602 are communicatively coupled by one or more network communication interfaces. For example, communication network 614 and device 602 may be communicatively coupled through interfaces 612, 630, and 640, as shown in FIG. 6. Communication network 614 and device 602 may be communicatively coupled wirelessly or through wire. In some example implementations, communication network 614 and device 602 may be communicatively coupled by the interfaces shown and discussed relative to FIG. 10, specifically as shown and discussed relative to a communication network 1014 and a computing device 1004, respectively. In some embodiments, communication network 614 and device 602 may be communicatively coupled in accordance with one or more suitable network communication interfaces not shown and discussed herein.

Content database 616 may be a relational database, a NoSQL, or an object-oriented database. Content database 616 may be any database or storage space (e.g., persistent or non-persistent storage) suitably configurable for housing media content- and identifier-related information, as shown and discussed herein. In some embodiments, content database 616 includes one or more database devices, which may be of a common database type, such as without limitation, one or more relational databases, or of differing database types, such as without limitation, one or more relational and one or more object-oriented database types. In a nonlimiting example, content database 616 may be configured as a database 1054 of FIG. 10.

In FIG. 6, content database 616 and communication network 614 are shown communicatively coupled through interfaces 615, 618, 620, and 636 for facilitating the exchange of media content- and identifier-related information for use by device 602 to facilitate media content- and identifier-related processing and displaying functions, as disclosed herein. Content database 616 and communication network 614 may be communicatively coupled wirelessly or through wire. While not shown in FIG. 6, in some embodiments, content database 616 may be coupled directly or indirectly, wirelessly or by wire, to device 602, and avoid communication network 614. In such an embodiment, relevant functions of communication network 614, if any, may be performed exclusively by content database 616, exclusively by device 602, or collectively by content database 616 and device 602. In an example implementation, database 616 may be a physically local storage device or storage space that is in part or in whole incorporated into device 602. In a nonlimiting example embodiments, as shown in FIG. 6, content database 616 and communication network 614 are communicatively coupled through interfaces 615, 618, 620, and 636.

In some embodiments, such as shown in the embodiment of FIG. 6, content database 616 is organized into storage spaces for housing consumer profile items, media content selection queue items, and machine learning-based selection items. For example, content database 616 may be organized into storage spaces of a consumer profile 622, a selection queue 624, and a machine learning model 626.

In some embodiments, device 602 may receive non-consumer-generated media content selections. In a nonlimiting example, device 602 may receive automated media content selection (identification) data from bots, machine learning, or artificial intelligence processing sources. Taking the example of machine learning sources, device 602 may receive automated machine-generated media content selection information from a trained model of machine learning model 626. The model may be trained by implementing any of a number of suitable machine learning algorithms for learned media content selection. For example, implementations of machine learning model 626 may be based on regression algorithms, algorithms by similarity, instance-based algorithms, regularization algorithms, decision tree algorithms, artificial neural network algorithms, rule learning algorithms, deep learning algorithms, or feature selection or graphics model algorithms. A training dataset of the model may be based on a single consumer's media content preferences or multi-consumer media content preferences.

Consumer profile 622 includes consumer preferences that may be applied to media content selection, such as, without limitation, based on media content rankings, for determining the sequential order of displaying identifiers, such as the sequential order of displaying identifiers 606 on display screen 604, corresponding to the selected media content. For example, consumer profile 622 may include information such as the consumer's favored media content segments and consumer's favored media content items, denoted by consumer likes, "" or "". For example, consumer profile 622 may include indicators or data representing media content segments 106b and 106c of system 100, in FIG. 1. Accordingly, consumer profile 622 may include a historical account of consumer's favored media content segments or media content items that, when provided to device 602 through interface 616 and communication network 614, may be used by device 602 to implement a media content and corresponding media content identifier display selection order.

Selection queue 624 includes information relating to consumer media content selections. For example, selection queue 624 may include media content ranking information, as discussed above. Machine learning model 626 may be a model trained to learn a consumer media content selection pattern and, based on the trained model, device 602 may determine the sequential order of identifiers 606 to display on display screen 604. Over time and as fed a sufficient amount of training data, the model more accurately learns consumer media content selections, and device 602 may use the trained model to predict the consumer selection preferences. The model may be trained for predicting differing media content selection features, for example, media content ranking. In some embodiments, the machine learning model 626 may be trained with more than one consumer's selection preference. For example, and as earlier indicated, machine learning model 626 may be trained with communal selection data, such as based on demography, age, or gender. The trained model may be a predictor of a media content selection based on selection data from residential neighbors' selections in a residential neighborhood surrounding the consumer for a communal media content consumption experience.

Content database 616 may be configured to store information other than that shown in FIG. 6 and discussed above. For example, content database 616 may be configured to save metadata parsed by processing circuitry of device 102, threshold data for comparison with remaining media content runtimes by processing circuitry of device 102, and weights associated with media content rankings, for example. Database 616 generally stores information related to media content and associated identifier processing and displaying by device 102. Alternatively, or additionally, device 102 may house some or all of the foregoing information locally, for example, in storage 1038 of computing device 1004 of FIG. 10. Information related to media content and associated identifier processing and displaying may be stored partially locally and partially in database 616.

Third-party server 628 may include one or more network servers of a third-party media content provider, communicatively and remotely coupled to device 602 through communication network 614. In some embodiments, server 628 is directly communicatively coupled to device 602 without interfacing through communication network 614. In some example implementations, server 628 and device 602 may be communicatively coupled by the interfaces shown and discussed relative to FIG. 10, specifically as shown and discussed relative to a server 1002 and computing device 1004, respectively. In some embodiments, server 628 provides media content for downloading and displaying by device 602 through communication network 614. Device 602 may similarly download media content recommendation information from server 628. For example, device 602 may download an initial sequential order of recommended subsequent media content for consumer consumption through communication network 614. Device 602 may display identifiers 606, identifying the recommended media content, in the same sequential order as the downloaded media content sequential order, and then rearrange the sequential order of the displayed identifiers 606, based on consumer request 638, to a rearranged sequential order for displaying on display screen 604. The recommended media content may be based on the currently displayed media content 608. In some embodiments, device 602 may determine the recommended media content locally and avoid the use of recommendations from server 628. In some cases, device 602 may use a combination of self-derived media content recommendations and recommended media content from server 628 to determine the recommended content.

Figure 7:
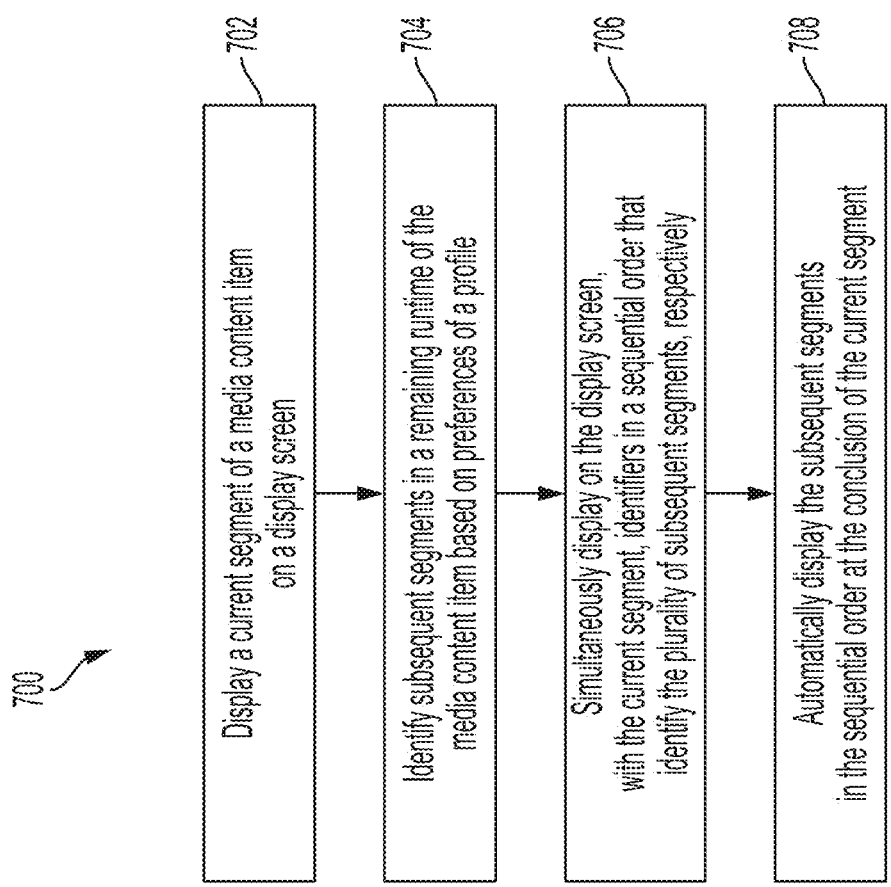
FIGS. 7-9 each depict an illustrative flowchart of a media content display process, in accordance with some embodiments of the disclosure.

FIG. 7 shows an illustrative flowchart of a media content display process, in accordance with some embodiments of the disclosure. In FIG. 7, a process 700 may be performed by a consumer device, such as, without limitation, devices 102, 202, 302, 402, 502, and 602 of respective FIGS. 1, 2, 3, 4, 5, and 6. In some embodiments, the steps of process 700 may be performed by computing device 1004 of FIG. 10. In some embodiments, the steps of process 700 may be performed by other consumer devices configured to process and display media content and associated identifiers as disclosed herein. For example, processing circuitry 1040 may execute program code stored in storage 1038 for carrying out the steps of process 700. In some embodiments, process 700 may be implemented, in part or in whole, on hardware. In some embodiments, process 700 may be implemented by executing program code and by hardware, collectively. In the discussion below, process 700 is presumed performed by execution of program code, for example, by execution of program code stored in storage 1038 (FIG. 10), by processing circuitry 1040. For simplicity of illustration, device 102 of system 100 of FIG. 1 is referenced in the below discussion of process 700, with interchangeable reference to media content display system 1000 of FIG. 10 and system 600 of FIG. 6 for providing an example implementation of process 700.

At step 702 of process 700, device 102 displays a current segment of a media content item on display screen 104. In an example embodiment and with reference to FIG. 10, processing circuitry 1040 of computing device 1004 may direct a display interface 1056 to display the current segment of the media content item on the display screen 1034. Next, at step 704, processing circuitry 1040 identifies subsequent (recommended) segments of the media content item in a remaining runtime of the media content based on one or more preferences of a profile. For example, device 102 may identify the subsequent segments based on recommended media content from server 628 of system 600. In some embodiments, processing circuitry, such as processing circuitry 1040, may perform identification of the subsequent media content segments. Device 102 may further retrieve profile preferences from consumer profile 622 of database 616 through interface 615 and communication network 614, and device 102 may then identify identifiers 106 based on the retrieved profile preferences.

At step 706 of process 700, processing circuitry 1040 may direct display interface 1056 to display on display screen 1034, simultaneously with displaying the current segment of the media content, identifiers 106 in a sequential order consistent with a predetermined or a machine-generated order as discussed above. Identifiers 106 identify corresponding subsequent media content segments for automatic display at step 708. At step 708, processing circuitry 1040 automatically causes to be displayed on display screen 1034 (or display screen 104 in system 100) the subsequent media content segments in the sequential order of identifiers 106 at the conclusion of the current media content segment.

Figure 8:
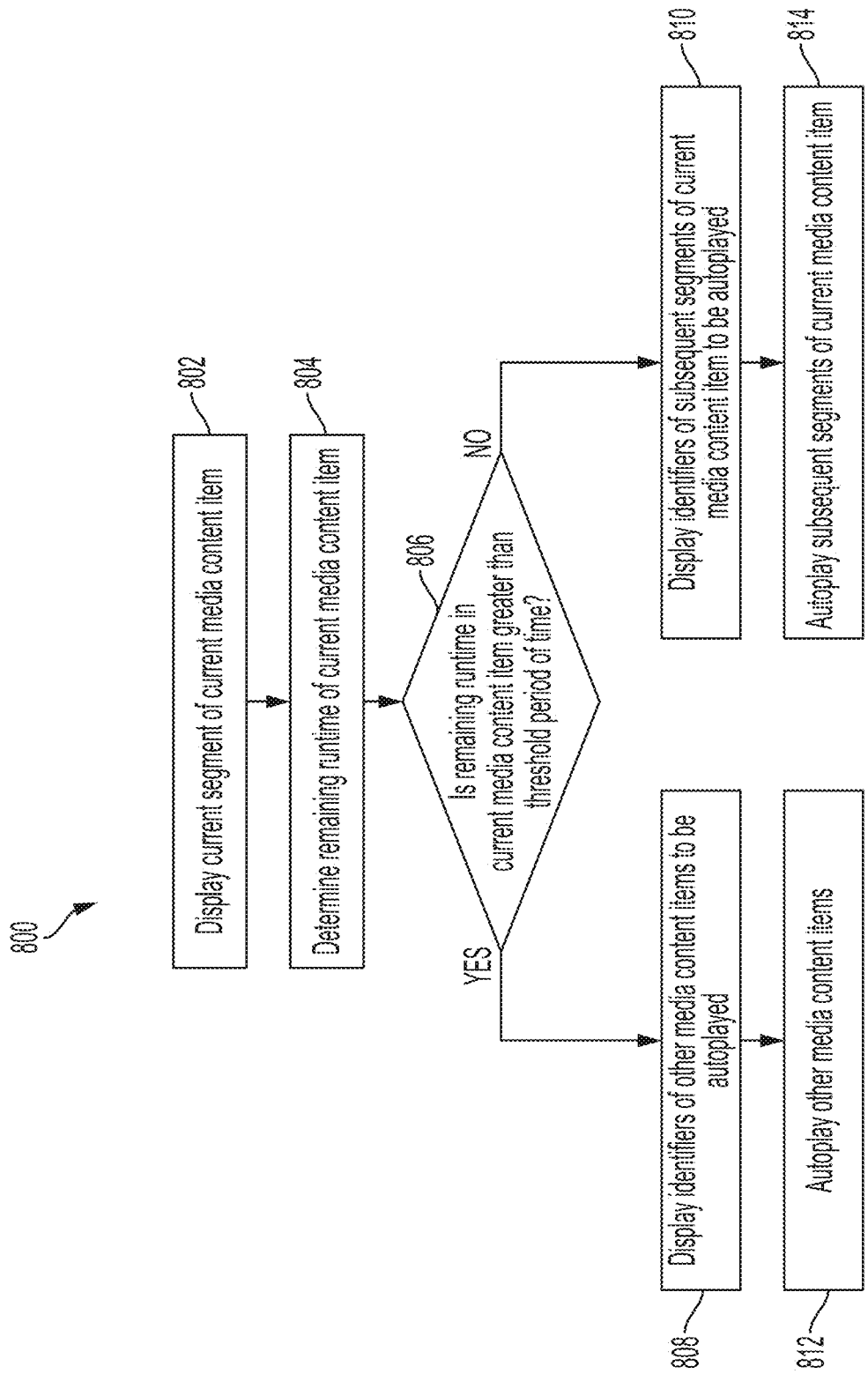

FIG. 8 shows an illustrative flowchart of a media content display process, in accordance with some embodiments of the disclosure. In FIG. 8, a process 800 may be performed by a consumer device, such as, without limitation, devices 102, 202, 302, 402, 502, and 602 of respective FIGS. 1, 2, 3, 4, 5, and 6. In some embodiments, the steps of process 800 may be performed by computing device 1004 of FIG. 10. In some embodiments, the steps of process 800 may be performed by other consumer devices configured to process and display media content and associated identifiers as disclosed herein. For example, processing circuitry 1040 may execute program code stored in storage 1038 for carrying out the steps of process 800. In some embodiments, process 800 may be implemented, in part or in whole, on hardware. In some embodiments, process 800 may be implemented by a combination of executing program code and hardware. In the discussion below, process 800 is presumed performed by execution of program code, for example, processing circuitry 1040 executing program code stored in storage 1038 (FIG. 10). For simplicity of illustration, device 102 of system 100 of FIG. 1 is referenced in the below discussion of process 800, with interchangeable references to media content display system 1000 of FIG. 10 and system 600 of FIG. 6, to illustrate an example implementation of process 800.

At step 802, a current segment of a current media content item is caused to be displayed on a display screen of a device. For example, processing circuitry 1040 executes program code stored in storage 1038 to cause display interface 1056 to display a scene from the last episode of the last season of the Game of Thrones series on display screen 1034. At step 804 of FIG. 8, the remaining runtime of the current media content item (e.g., remaining runtime of the Game of Thrones last episode of the last season) is determined. At step 806, the remaining runtime determined at step 804 is tested against a threshold period of time. If at step 806, the remaining runtime of the current media item is determined to exceed a threshold period of time, process 800 proceeds to step 808; otherwise, process 800 proceeds to step 810. At step 808, the system displays identifiers of media content items other than the current media content item. For example, processing circuit 100 may determine that because the Game of Thrones episode is nearing the end, the consumer is less likely to be interested in Harry Potter and displays identifiers of other recommended series or other recommended movies, for example. At step 810, the identifiers of subsequent segments of the current media content item are displayed. For example, processing circuitry 100 causes display interface 1056 to display subsequent scenes of the last episode of the last season of the Game of Thrones series on display screen 1034.

At step 814, processing circuitry 1040 directs display interface 1056 to automatically play subsequent segments of the current media content (e.g., subsequent scenes of the last episode, last season of Game of Thrones series) corresponding to the identifiers of step 810. At step 812, processing circuitry 1040 directs display interface 1056 to automatically play other media content items (e.g., Lord of the Rings, The Hobbit) corresponding to the identifiers of step 808.

Figure 9:
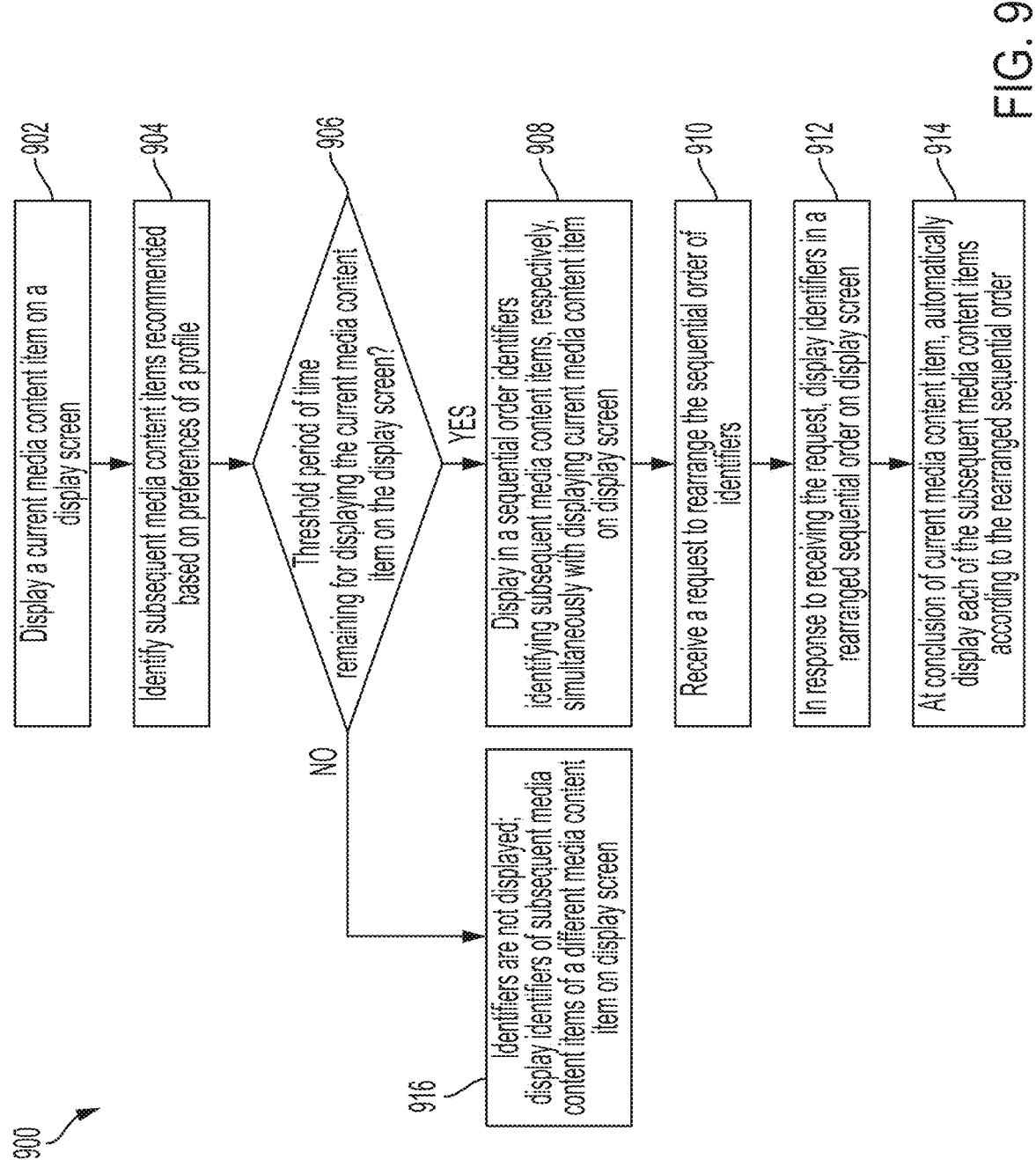

FIG. 9 shows an illustrative flowchart of a media content display process, in accordance with some embodiments of the disclosure. In FIG. 9, a process 900 may be performed by a consumer device, such as, without limitation, devices 102, 202, 302, 402, 502, and 602 of respective FIGS. 1, 2, 3, 4, 5, and 6. In some embodiments, the steps of process 900 may be performed by computing device 1004 of FIG. 10. In some embodiments, the steps of process 900 may be performed by other consumer devices suitably configurable to process and display media content and associated identifiers as disclosed herein. For example, processing circuitry 1040 may execute program code stored in storage 1038 for carrying out the steps of process 900. In some embodiments, process 900 may be implemented, in part or in whole, on hardware. In some embodiments, process 900 may be implemented by executing program code and by hardware, collectively. In the discussion below, process 900 is presumed performed by execution of program code, for example, processing circuitry 1040 executing program code stored in storage 1038 (FIG. 10) may perform the steps of process 900. For simplicity of illustration, device 102 of system 100 of FIG. 1 is referenced in the below discussion of process 900, with interchangeable reference to media content display system 1000 of FIG. 10 and system 600 of FIG. 6 for providing an example implementation of process 900.

At step 902 of process 900, device 102 displays a current media content item on display screen 104. In an example implementation, processing circuitry 1040 may direct display interface 1056 to generate the current media content item on display screen 1034. Next, at step 904, processing circuitry 1040 identifies subsequent media content items. As with process 700 described above, in process 900, at step 904, device 102 may solicit identification of subsequent (recommended) media content items from server 628 (FIG. 6) through communication network 614, or device 102 may derive the identifications locally. In the case where device 102 performs identification of subsequent media content items locally, processing circuitry 1040 may perform the identification, for example. Processing circuitry 1040 may identify the subsequent recommended media content items based on profile preferences, for example, based on the preferences from consumer profile 622 of content database 616, received through interface 615.

At step 906 of process 900, device 102 may determine a remaining time for displaying the current media content item on display screen 104 (current media content item runtime). Device 102 may then determine, when a threshold period of time for displaying the current media content item on display screen 104 remains, to display, in a sequential order, identifiers that identify the subsequent media content items, respectively, while simultaneously displaying the current media content item in a full display screen mode on display screen 104, at step 908. In an implementation example, the foregoing steps may be performed by processing circuitry 1040. For example, processing circuitry 1040 may determine the runtime of the current media content item. Processing circuitry 1040 may then compare the current media content item runtime with a threshold period of time and, in response to determining, at step 906, that the current media content item runtime is equal to or exceeds the threshold period of time, at step 908 of FIG. 9, processing circuit 1040 may direct display interface 1056 to generate, for display on display screen 1034 (or display screen 104, in FIG. 1) in a full display screen mode, in a sequential order, identifiers identifying the subsequent media content items, respectively. Processing circuitry 1040 may further direct display interface 1056 to simultaneously display the current media content item on display screen 1034 (or display screen 104) in the full display screen mode. In response to determining the current media content item runtime is lower than the threshold period of time, at step 906 of FIG. 9, process 900 proceeds to step 916. At step 916, the identifiers are not displayed while the current media content item is displayed, and display interface 1056 may generate a display of identifiers corresponding to subsequent media content items unrelated to the currently displayed media content item. Processing circuitry 1040 may direct display interface 1056 to generate the display of identifiers corresponding to subsequent media content items unrelated to the currently displayed media content item after the conclusion of the currently displayed media content item, for example, when the different media content item is displayed on display screen 1034.

After step 908, in FIG. 9, process 900 proceeds to step 910 for device 102 receiving a request to rearrange the sequential order of the identifiers corresponding to the subsequent media content items of step 908. An example of the request is consumer request 638, shown in FIG. 6. In an example embodiment, at step 910, processing circuitry 1040 receives the request for rearranging the sequential order of identifiers.

In response to receiving the request for rearranging the sequential order of identifiers, at step 912, processing circuitry 1040 directs display interface 1056 to generate a display of the identifiers in the rearranged sequential order on display screen 1034. At the conclusion of the current media content item, at step 914 of process 900, processing circuitry 1040 directs display interface 1056 to automatically display the subsequent media content items according to the rearranged sequential order of the identifiers.

It is understood that the order of steps of each of the processes 700, 800, and 900, as shown in the flowcharts of FIGS. 7, 8, and 9, respectively, may be suitably changed or exchanged. For example, one or more steps, as may be suitable, can be added to or deleted from each of the processes 700, 800, and 900.

A consumer device may include features for accessing, processing, transmitting and receiving media content identifiers corresponding to media content items, in addition to other features, for example to carry out the functions and implementations shown and described herein, with one or more consumer devices (i.e., consumer equipment) such as the generalized embodiments of an illustrative consumer device. FIG. 10 is a block diagram of illustrative system 1000 for processing media content items, media content segments, and identifiers, in accordance with some embodiments of the present disclosure. System 1000 may include more than one of each type of consumer device, but only one each type of consumer device is shown included in system 1000 in FIG. 10 to avoid overcomplicating the drawing. In addition, a consumer may utilize more than one type of consumer device and more than one of each type of consumer device.

System 1000 is shown to include server 1002, computing device 1004, communication network 1014, and database 1054. In some embodiments, server 1002 is, in part or in whole, incorporated in communication network 1014. In some embodiments, server 1002 may be configured as server 628 in FIG. 6.

In some embodiments, computing device 1004 may be configured, in whole or in part, as a computing device. In some embodiments, computing device 1004 may include any consumer electronic device that performs media content and identifier processing operations as disclosed herein. In some embodiments, computing device 1004 may incorporate, in part or in whole, or may be communicatively coupled to each of consumer devices 102, 202, 302, 402, 502, and 602 of FIGS. 1, 2, 3, 4, 5, and 6, respectively. As referred to herein, the phrases "consumer equipment device," "consumer equipment," "consumer device," "electronic device," "electronic equipment," "media equipment device," "consumer handheld device," "consumer computer device," "media content device," "media content display device," "media content computing device," or "media device" should be understood to mean any devices for processing media content and identifiers as described above or accessing content, such as, without limitation, a desktop computer, a tablet, a laptop, a remote server, any other suitable device, or any combination thereof, for media content and identifier processing, as described above, or accessing content from, without limitation, wearable devices with projected image reflection capability, such as a head-mounted display (HMD) (e.g., optical head-mounted display (OHMD)); electronic devices with computer vision features, such as augmented reality (AR); virtual reality (VR); extended reality (XR); or mixed reality (MR); portable hub computing packs; a television; a Smart TV; a set-top box; an integrated receiver decoder (IRD) for handling satellite television; a digital storage device; a digital media receiver (DMR); a digital media adapter (DMA); a streaming media device, a DVD player; a DVD recorder; a connected DVD; a local media server; a BLU-RAY player; a BLU-RAY recorder; a personal computer (PC); a laptop computer; a tablet computer; a WebTV box; a personal computer television (PC/TV); a PC media server; a PC media center; a handheld computer; a stationary telephone; a personal digital assistant (PDA); a mobile telephone; a portable video player; a portable music player; a portable gaming machine; a smartphone; or any other television equipment; computing equipment; a wireless device; and/or combination of the same. In some embodiments, the consumer device may have a front-facing screen and a rear-facing screen, multiple front screens, or multiple angled screens. In some embodiments, the consumer device may have a front-facing camera and/or a rear-facing camera. On these consumer devices, consumers may be able to navigate among and locate the same content available through a television. Consequently, a consumer interface in accordance with the present disclosure may be available on these devices, as well. The consumer interface may be for content available only through a television, for content available only through one or more of other types of consumer devices, or for content both available through a television and one or more of the other types of consumer devices. The consumer interfaces described herein may be provided as online applications (i.e., provided on a website), or as stand-alone applications or clients on consumer equipment devices. Various devices and platforms that may implement the present disclosure are described in more detail below.

Computing device 1004 is shown to generally include control circuitry 1028, hardware interface 1042, microphone/speaker circuitry 1032, display screen 1034, and computing device interface 1036. In some embodiments, display screen 1034 is configured as or analogous to device screen 104, 204, 304, 404, 505, or 604 of FIGS. 1-6, respectively. Control circuitry 1028 is shown to include storage 1038 and processing circuitry 1040. Computing device interface 1036 is shown to include input interface 1050, output interface 1052, and display interface 1056. In an implementation example, input interface 1050 may receive a rearrangement request, such as consumer request 638, in FIG. 6. Processing circuitry 1040 may be provided with request 638 for initiating and performing rearrangement of sequential identifiers corresponding to subsequent media content items or media content segments per the request. It is understood that computing device interface 1036 may include additional or fewer components than those shown in FIG. 10.

In some embodiments, display screen 1034 may comprise a touchscreen, a television display or a computer display. In a practical example, display screen 1034 may display media content items, media content segments, and identifiers, as processed by devices 102, 202, 302, 402, 502, and 602.

In some embodiments, computing device 1004 is part of a system along with a server 1002, communication network 1014, and database 1054. It is understood that while a single instance of a component may be shown and described relative to FIG. 10, additional instances of the component may be employed. For example, server 1002 may include, or may be incorporated in, more than one server. Similarly, communication network 1014 may include, or may be incorporated in, more than one communication network.

Server 1002 is shown communicatively coupled to computing device 1004 through communication network 1014. While not shown in FIG. 10, server 1002 may be directly communicatively coupled to computing device 1004, for example, in a system absent or bypassing communication network 1014.

Communication network 1014 may comprise one or more network systems, such as, without limitation, an Internet, LAN, WIFI or other network systems suitable for media processing applications. In some embodiments, the system of FIG. 10 excludes server 1002, and functionality that would otherwise be implemented by server 1002 is instead implemented by other components of the system, such as one or more components of communication network 1014. In still other embodiments, server 1002 works in conjunction with one or more components of communication network 1014 to implement certain functionality described herein in a distributed or cooperative manner. Similarly, in some embodiments, the system may exclude computing device 1004, and functionality that would otherwise be implemented by computing device 1004 is instead implemented by other components of the system, such as one or more components of communication network 1014 or server 1002 or a combination thereof. In still other embodiments, computing device 1004 works in conjunction with one or more components of communication network 1014 or server 1002 to implement certain functionality described herein in a distributed or cooperative manner.

Database 1054 is communicatively coupled, through communication network 1014, to server 1002 and computing device 1004. In some embodiments, database 1054 may be directly communicatively coupled to computing device 1004, as discussed relative to content database 616 and device 602 of FIG. 6.

In some embodiments, computing device 1004 or control circuitry 1028 may be configured as devices 102, 202, or 302 of FIGS. 1, 2, and 3, respectively.

Server 1002 includes control circuitry 1020 comprising processing circuitry 1026 and storage 1024. Each of storages 1024 and 1038 may be an electronic storage device.

Each storage 1024, 1038 may be used to store various types of content, identifiers, metadata, and or other types of data. Non-volatile memory may also be used (e.g., to launch a boot-up routine and other instructions). Cloud-based storage may be used to supplement storages 1024, 1038 or instead of storages 1024, 1038. In some embodiments, control circuitry 1020 and/or 1028 executes instructions for an application stored in memory (e.g., storage 1024 and/or storage 1038). Specifically, control circuitry 1020 and/or 1028 may be instructed by the application to perform the functions discussed herein. In some implementations, any action performed by control circuitry 1020 and/or 1028 may be based on instructions received from the application. For example, the application may be implemented as software or a set of executable instructions that may be stored in storage 1024 and/or 1038 and executed by control circuitry 1020 and/or 1028. In some embodiments, the application may be a client/server application where only a client application resides on computing device 1004, and a server application resides on server 1002.

The application may be implemented using any suitable architecture. For example, it may be a stand-alone application wholly implemented on computing device 1004. In such an approach, instructions for the application are stored locally (e.g., in storage 1038), and data for use by the application is downloaded on a periodic basis (e.g., from an out-of-band feed, from an Internet resource, or using another suitable approach). Control circuitry 1028 may retrieve instructions for the application from storage 1038 and process the instructions to perform the functionality described herein. Based on the processed instructions, control circuitry 1028 may, for example, perform processes 700-900 in response to input received from input interface 1050, server 1002, and/or communication network 1014. For example, in response to receiving media content item identification information, and identifiers, control circuitry 1028 may perform the steps of processes 700-900 or processes relative to various embodiments, such as the example of FIGS. 1-6.

In client/server-based embodiments, control circuitry 1028 may include communication circuitry suitable for communicating with an application server (e.g., server 1002) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1014). In another example of a client/server-based application, control circuitry 1028 runs a web browser that interprets web pages provided by a remote server (e.g., server 1002). For example, the remote server may store the instructions for the application in a storage device. The remote server may process the stored instructions using circuitry (e.g., control circuitry 1028) to generate displays. Computing device 1004 may receive the displays generated by the remote server and may display the content of the displays locally via display screen 1034. This way, the processing of the instructions is performed remotely (e.g., by server 1002) while the resulting displays, such as the display windows described elsewhere herein, are provided locally on computing device 1004. Computing device 1004 may receive inputs from the consumer via input interface 1050 and transmit those inputs to the remote server for processing and generating the corresponding displays. Alternatively, computing device 1004 may receive inputs from the consumer via input interface 1050 and process and display the received inputs locally, by control circuitry 1028 and display screen 1034, respectively.

Server 1002 and computing device 1004 may transmit and receive content and data such as media content and identifiers via communication network 1014. For example, server 1002 may be configured as a third-party server/processor, and computing device 1004 may be configured as a consumer device to transmit media content recommendations to and receive media content from server 1002, such as shown and discussed relative to FIGS. 1-6. Control circuitry 1020 may send and receive commands, requests, media content, media content recommendations, identifiers, and other suitable data through communication network 1014 using server interface 1022. In some embodiments, server 1002 is configured, in part or in whole, as server 628 of FIG. 6.

In some embodiments, processing circuitry 1040, control circuitry 1028, or a combination thereof, may implement one or more of the processes of FIGS. 1-6. In some embodiments, the processing circuitry, control circuitry, or a combination thereof, may implement one or more functions or components of the devices of FIGS. 1-6, such as devices 102, 202, 302, 402, 502, and 602, respectively.

Control circuitry 1020 and/or 1028 may be based on any suitable processing circuitry such as processing circuitry 1026 and/or 1040, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1020 and/or control circuitry 1028 are configured to implement a media content display system, such as systems 100, 200, 300, 400, 500, and 600 of FIGS. 1, 2, 3, 4, 5, and 6, respectively, or parts thereof, that perform various media content and identifier processing, media content and identifier reception and transmission, display functions, and operation processes described and shown in connection with FIGS. 1-6.

Computing device 1004 receives a consumer request at input interface 1050, as discussed above. Computing device 1004 may receive and transmit media content- and identifier-related data through input interface 1050 and output interface 1052, respectively. For example, computing device 1004 may receive, in addition to media content, media content recommendations, and identifier data, ranking data, audio data, historical consumer preference data, model-based prediction data, and other media content selection-related data through input interface 1050. Computing device 1004 transmits data through output interface 1052. For example, computing device 1004 may transmit, in addition to media content, media content recommendations, and identifier data, selection data, ranking and weight data, and other media content selection-related data through output interface 1052. In some embodiments, computing device 1004 is a consumer device (or media player) configured as devices 102, 202, 302, 402, 502, and 602 of FIGS. 1, 2, 3, 4, 5, and 6, respectively, with the capability to receive voice, text, data files, or a combination thereof. It is understood that computing device 1004 is not limited to the embodiments and methods shown and described herein.

In some embodiments, input interface 1050 and output interface 1052 may each be a device, such as the devices of FIGS. 1-6. In some embodiments, input interface 1050 and output interface 1052 may be a receiver, such as the audio receiver of FIG. 6. Transmission of a media content item and identifier or audio input to computing device 1004 may be accomplished using a wired connection, such as an audio cable, USB cable, ethernet cable or the like attached to a corresponding input port at local device 300, or may be accomplished using a wireless connection, such as Bluetooth®, WIFI, WiMAX, GSM, UTMS, CDMA, TDMA, 3G, 4G, 5G, Li-Fi, LTE, or any other suitable wireless transmission protocol. Bluetooth® is a registered trademark of Bluetooth SIG, Inc. Transmission of data, for example in the form of audio or text or information, may be accomplished through output interface 1052 to communication network 1014, server 1002, or database 1054 using a wired connection, such as an audio cable, USB cable, ethernet cable or the like, or may be accomplished using a wireless connection, such as Bluetooth, WIFI, WiMAX, GSM, UTMS, CDMA, TDMA, 3G, 4G, 5G, Li-Fi, LTE, or any other suitable wireless transmission protocol.

Processing circuitry 1040 may receive input from input interface 1050. For example, processing circuitry 1040 may receive consumer rearrangement requests from input interface 1050. Processing circuitry 1040 may convert or translate media content and identifier input, which may be in the form of text, audio or other types of data, from a text to digital signals. In some embodiments, input interface 1050 performs the translation to digital signals. In some embodiments, processing circuitry 1040 (or processing circuitry 826, as the case may be) carry out disclosed processes and methods. For example, processing circuitry 1040 or processing circuitry 1026 may perform processes 100-900 of FIGS. 1-9, respectively.

In some embodiments, each of devices 102, 202, 302, 402, 502, and 602 of FIGS. 1, 2 3, 4, 5, and 6, respectively, or other consumer devices coupled to devices 102, 202, 302, 402, 502, 602 may generate a display on display screen 1034. Input interface 1050, display screen 1034, or both may include a touchscreen configured to provide a display and receive haptic input (gestures). For example, the touchscreen may be configured to receive haptic input from a finger, a stylus, or both. In some embodiments, computing device 1004 may include a front-facing screen and a rear-facing screen, multiple front screens, or multiple angled screens. In some embodiments, input interface 1050 includes a remote-control device having one or more microphones, buttons, keypads, any other components configured to receive consumer input, or combinations thereof. For example, input interface 1050 may include a handheld remote-control device having an alphanumeric keypad and option buttons, such as shown in the embodiment FIG. 6.

Microphone/speaker circuitry 1032 houses a microphone, an audio receiver, and a speaker and may be provided as integrated with other elements of consumer device 1004 or may be a stand-alone unit. The audio component of videos and other content displayed on display screen 1034 may be played through the speaker feature of unit 1032. In some embodiments, the audio may be distributed to a receiver (not shown), which processes and outputs the audio via the speaker feature of circuitry 1032. The microphone feature of circuitry 1032 receives voice input that may be processed by processing circuitry 1040. In some embodiments, the microphone feature of circuitry 1032 accepts voice command input for rearranging the sequential order of subsequent media content segments or media content items, as discussed relative to systems 100, 200, 300, 400, 500, and 600 of respective FIGS. 1-6. In some embodiments, for example, control circuitry 1028 is configured to provide audio cues to a consumer, or other audio feedback to a consumer, using circuitry 1032. As noted above, in some embodiments, the audio receiver of computing device 1004 may be a microphone, such as the microphone feature of circuitry 1032, configured to receive audio input such as voice utterances or speech (e.g., voice commands). For example, a consumer may speak letters or words that are received by the microphone and converted to text by control circuitry 1028. In a further example, a consumer may voice commands that are received by the microphone and recognized by control circuitry 1028.

An application may be implemented using any suitable architecture. For example, a stand-alone application may be wholly implemented on computing device 1004. In some such embodiments, instructions for the application are stored locally (e.g., in storage 1038), and data for use by the application is downloaded on a periodic basis (e.g., from an out-of-band feed, from an Internet resource, or using another suitable approach). Control circuitry 1028 may retrieve instructions for the application from storage 1038 and process the instructions to generate any of the displays discussed herein. Based on the processed instructions, control circuitry 1028 may determine what action to perform when input is received from input interface 1050. For example, a screen highlighted word on input interface 1050 may indicate that a word selection by a consumer. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory (RAM), etc.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    causing to be displayed a current media content item on a display screen;
    identifying, using processing circuitry, a plurality of subsequent media content items;
    determining a remaining runtime of the media content item;
    in response to determining that the remaining runtime of the media content item exceeds a threshold period of time, causing to be displayed in a sequential order a plurality of identifiers that identify the plurality of subsequent media content items, respectively, simultaneously with the current media content item on the display screen, wherein the sequential order is rearrangeable, and wherein none of the plurality of subsequent media content items are included in the remaining runtime of the current media content item;
    receiving a request to rearrange the sequential order of the plurality of identifiers; and
    in response to receiving the request:
        causing to be displayed, using processing circuitry, each of the plurality of identifiers in a rearranged order based on an instruction corresponding to the request; and
        at the conclusion of the current media content item, causing to be automatically displayed, each of the plurality of subsequent media content items according to the rearranged order based on the instruction.

2. The method of claim 1, further comprising:
    receiving a request to add or remove an identifier to the plurality of identifiers;
    in response to receiving the request to add or remove an identifier, causing to be displayed identifiers corresponding to the plurality of identifiers reflecting the addition or removal of the identifier, wherein the rearranged order reflects the addition or removal of the identifier.

3. The method of claim 1, further comprising:
    in response to receiving a request to add a new identifier to the plurality of identifiers, adding the new identifier in a position in the rearranged order of the plurality of identifiers corresponding to a like position of an existing identifier in the sequential order of the plurality of identifiers.

4. The method of claim 1, wherein the sequential order of the plurality of identifiers is based on one or more preferences of a profile.

5. The method of claim 4, wherein the one or more preferences are based on historical media content consumption associated with the profile.

6. The method of claim 1, further comprising determining a number of the plurality of identifiers to be displayed on the display screen based on a screen size of the display screen.

7. The method of claim 1, wherein the plurality of identifiers to be displayed on the display screen is based on metadata associated with the current media content item.

8. The method of claim 1, further comprising determining a number of the plurality of identifiers to be displayed on the display screen based on a zoom factor of the display screen.

9. The method of claim 1, further comprising determining a number of the plurality of identifiers to be displayed on the display screen based on the remaining runtime of the current media content item.

10. The method of claim 1, wherein the subsequent media content items have rankings, respectively, and further wherein the sequential order of the plurality of identifiers to be displayed is based on the rankings corresponding to the subsequent media content items.

11. The method of claim 10, wherein the rankings are relative rankings or absolute rankings.

12. The method of claim 10, wherein the rankings of the subsequent media content items are determined based on a trained machine learning model.

13. The method of claim 1, wherein the plurality of identifiers is caused to be displayed on an overlay section of the display screen, wherein the overlay section is smaller in size than a size of the display screen.

14. The method of claim 13, further comprising determining a display screen location for the overlay section based on image frames of the current media content item displayed on the display screen.

15. A system comprising:
    processing circuitry configured to:
        cause to be displayed a current media content item on a display screen;
        identify a plurality of subsequent media content items;
        determine a remaining runtime of the media content item;
        in response to determining that the remaining runtime of the media content item exceeds a threshold period of time, cause to be displayed in a sequential order a plurality of identifiers that identify the plurality of subsequent media content items, respectively, simultaneously with the current media content item on the display screen, wherein the sequential order is rearrangeable, and wherein none of the plurality of subsequent media content items are included in the remaining runtime of the current media content item;
        receive a request to rearrange the sequential order of the plurality of identifiers; and
        in response to receiving the request:
            cause to be displayed, each of the plurality of identifiers in a rearranged order based on an instruction corresponding to the request; and
            at the conclusion of the current media content item, cause to be automatically displayed, each of the plurality of subsequent media content items according to the rearranged order based on the instruction.

16. The system of claim 15, wherein the processing circuitry is further configured to:
    receive a request to add or remove an identifier to the plurality of identifiers;
    in response to receiving the request to add or remove an identifier, cause to be displayed identifiers corresponding to the plurality of identifiers reflecting the addition or removal of the identifier, wherein the rearranged order reflects the addition or removal of the identifier.

17. The system of claim 15, wherein the processing circuitry is further configured to in response to receiving a request to add a new identifier to the plurality of identifiers, add the new identifier in a position in the rearranged order of the plurality of identifiers corresponding to a like position of an existing identifier in the sequential order of the plurality of identifiers.

18. The system of claim 15, wherein the sequential order of the plurality of identifiers is based on one or more preferences of a profile.

19. The system of claim 18, wherein the one or more preferences are based on historical media content consumption associated with the profile.

20. The system of claim 15, wherein the processing circuitry is further configured to determine a number of the plurality of identifiers to be displayed on the display screen based on a screen size of the display screen.

* * * * *